United States Patent
Khedr et al.

(10) Patent No.: US 11,843,687 B2
(45) Date of Patent: *Dec. 12, 2023

(54) SYSTEMS, DEVICES, AND PROCESSES FOR HOMOMORPHIC ENCRYPTION

(71) Applicant: LORICA CYBERSECURITY INC., Toronto (CA)

(72) Inventors: Alhassan Khedr, Toronto (CA); Glenn Gulak, Toronto (CA); Vinod Vaikuntanathan, Boston, MA (US)

(73) Assignee: LORICA CYBERSECURITY INC., Toronto (CA)

( * ) Notice: Subject to any disclaimer, the term of this patent is extended or adjusted under 35 U.S.C. 154(b) by 179 days.

This patent is subject to a terminal disclaimer.

(21) Appl. No.: 16/990,431

(22) Filed: Aug. 11, 2020

(65) Prior Publication Data

US 2021/0075588 A1  Mar. 11, 2021

Related U.S. Application Data

(63) Continuation of application No. 16/053,870, filed on Aug. 3, 2018, now Pat. No. 10,778,408, which is a
(Continued)

(51) Int. Cl.
*G06F 21/00*   (2013.01)
*H04L 9/00*    (2022.01)
*H04L 9/30*    (2006.01)

(52) U.S. Cl.
CPC ............... *H04L 9/008* (2013.01); *H04L 9/30* (2013.01); *H04L 2209/24* (2013.01)

(58) Field of Classification Search
None
See application file for complete search history.

(56) References Cited

U.S. PATENT DOCUMENTS

| 5,208,858 A  * | 5/1993 | Vollert .................... H04L 63/12 |
| | | 380/42 |
| 7,929,704 B2 * | 4/2011 | Hauge ................... H04L 9/0869 |
| | | 713/180 |

(Continued)

OTHER PUBLICATIONS

Peng, Ningduo et al. A fast additively symmetric homomorphic encryption scheme for vector data. Proceedings 2013 International Conference on Mechatronic Sciences, Electric Engineering and Computer (MEC). https://ieeexplore.ieee.org/stamp/stamp.jsp?tp=&arnumber=6885469 (Year: 2013).*

(Continued)

*Primary Examiner* — Jeremiah L Avery
(74) *Attorney, Agent, or Firm* — HEER LAW; Christopher D. Heer; Larissa Leong

(57) ABSTRACT

Remote terminals are configured to generate ciphertexts from plaintext polynomials. Each ciphertext corresponds to a plaintext polynomial bound to a message space of a polynomial-based fully homomorphic cryptographic scheme. At least one server is configured to receive ciphertexts via a network from the plurality of remote terminals. The server performs a multiplication operation and an addition operation on the ciphertexts to obtain resultant ciphertexts. The multiplication operation includes performing a bitwise decomposition function on a ciphertext to obtain a bitwise decomposed ciphertext. The bitwise decomposition function maps a multi-bit data type to a sequence of bits. The multiplication operation further includes performing matrix multiplication on the bitwise decomposed ciphertext and a data element belonging to a set of data elements. Message filters, data search engines, and other applications are discussed.

27 Claims, 21 Drawing Sheets

Related U.S. Application Data continuation of application No. 14/634,787, filed on Feb. 28, 2015, now Pat. No. 10,075,288.

(60) Provisional application No. 61/946,557, filed on Feb. 28, 2014.

(56) References Cited

U.S. PATENT DOCUMENTS

| | | | | |
|---|---|---|---|---|
| 9,281,941 | B2* | 3/2016 | Gentry | H04L 9/0618 |
| 2006/0140401 | A1* | 6/2006 | Johnson | G06F 21/14 |
| | | | | 380/44 |
| 2009/0304179 | A1* | 12/2009 | Gressel | H04L 9/0643 |
| | | | | 380/268 |
| 2010/0111296 | A1* | 5/2010 | Brown | H04L 9/3066 |
| | | | | 380/28 |
| 2011/0145593 | A1* | 6/2011 | Auradkar | H04L 9/0833 |
| | | | | 713/189 |
| 2012/0039463 | A1* | 2/2012 | Gentry | H04L 9/0816 |
| | | | | 380/28 |
| 2012/0278622 | A1* | 11/2012 | Lesavich | G06F 16/958 |
| | | | | 713/168 |
| 2013/0170640 | A1* | 7/2013 | Gentry | H04L 9/008 |
| | | | | 380/30 |
| 2013/0216044 | A1* | 8/2013 | Gentry | H04L 9/008 |
| | | | | 380/277 |
| 2013/0329883 | A1* | 12/2013 | Tamayo-Rios | H04L 9/008 |
| | | | | 380/28 |
| 2013/0339722 | A1* | 12/2013 | Krendelev | H04L 9/008 |
| | | | | 713/150 |
| 2014/0177828 | A1* | 6/2014 | Loftus | H04L 9/0852 |
| | | | | 380/44 |
| 2014/0189792 | A1* | 7/2014 | Lesavich | H04W 4/60 |
| | | | | 726/3 |
| 2014/0215222 | A1* | 7/2014 | Sakumoto | H04L 9/3093 |
| | | | | 713/176 |
| 2015/0154406 | A1* | 6/2015 | Naehrig | G06F 21/602 |
| | | | | 713/165 |

OTHER PUBLICATIONS

Plantard, Thomas et al. Fully Homomorphic Encryption Using Hidden Ideal Lattice. IEEE Transactions on Information Forensics and Security, vol. 8, Issue: 12. https://ieeexplore.ieee.org/stamp/stamp.jsp?tp=&arnumber=6650119 (Year: 2013).*

Aguilar-Melchor, Carlos et al. Recent Advances in Homomorphic Encryption: A Possible Future for Signal Processing in the Encrypted Domain. IEEE Signal Processing Magazine, vol. 30, Issue: 2. https://ieeexplore.ieee.org/stamp/stamp.jsp?tp=&arnumber=6461628 (Year: 2013).*

* cited by examiner

| GSW Scheme | Present Invention |
|---|---|
| • Secret Key Size Reduction (Decryption Function) | |
| $C$ (Ctxt)   $v$ (Skey)   $u$ (Ptxt) | $C$ (Ctxt)   $s$ (Skey)   $u$ (Ptxt) |

FIG. 3

| GSW Scheme | Present Invention |
|---|---|
| • Ctxt Size Reduction ( $N = 2 \times \log(q)$ ) | |
| $C_1$   $C_2$   $C_3$ | $C_1$   $C_2$   $C_3$ |
| • Flatten Function Removal (Ctxt Operations) | |
| $C_{op} = Flatten(C_1 \times C_2)$ | $C_{op} = C_1 \times C_2$ |

FIG. 4

```
Function : Multiply "e" Ciphertexts Function
    Input: "e", Ctxts: C_1, C_2, ..., C_e
    Output: C_answer
        The multiplication result of "e" input Ctxts.

C_answer = C_1
For i from 2 to e {
    C_answer = C_answer × C_i
}
Return C_answer
```

FIG. 5

Parameter Selection and Keys/Ctxt Sizes.

| Parameter | EXAMPLE SELECTION |
|---|---|
| $\lambda$ | 80 |
| $n$ | 1024 |
| $\ell$ | 31 |
| $N$ | $2 \cdot \ell = 62$ |
| $\sigma_k, \sigma_c$ | 10 |
| SK size | $2 \times n \times \ell = 7.936\ KBytes$ |
| PK size | $2 \times n \times \ell = 7.936\ KBytes$ |
| Ctxt size | $N \times 2 \times n \times \ell = 492.032\ KBytes$ |

FIG. 6

```
Function : Word List Encryption
    Input: Set of words in a list (email)
    Output: Encrypted words using HE For each word in the list {
      a = Hash( word ).
      For each bit i in a {
        $C_i$ = Encrypt( $a_i$ ).
        Store $C_i$ to the output list.
      }
    }
```

FIG. 8

```
Function : Homomorphic Email Spam Filter
    Input₁: Encrypted email
    Input₂: Spam database (DB)
    Output: Encrypted email spam/ham probability prob = 0
    For each encrypted word "i" in the email {
        For each word "j" in the database {
            match = WordMatch(EmailWord_i, DBWord_j)
            prob += match × WordProbability_j
        }
    }
    Return prob
```

FIG. 9

```
Function : Word Matching WordMatch
    Input₁: Encrypted bits of Word₁ (C_i)
    Input₂: Plaintext Word₂
    Output: Encrypted binary bit "match" = 1 if words match, 0 otherwise match = 1
    a = Hash( Word₂ ).
    For each bit i in a {
        If ( a_i = 1 )
            B_i = C_i
        Else
            B_i = 1 - C_i
        match = match × B_i
    }
    Return match
```

FIG. 10

```
Function : Enc. Word Matching EncWordMatch
    Input₁: Encrypted bits of Word₁ (C_i)
    Input₂: Encrypted bits of Word₂ (D_i)
    Output: Encrypted binary bit "match" = 1 if words match, 0 otherwise match = 1
    For each bit i {
        B_i = ~(C_i ⊕ D_i)
        match = match × B_i
    }
    Return match
```

FIG. 11

```
Function : Secure Multiple Keyword Search In Encrypted Files
    Input₁: Set of encrypted keywords
    Input₂: Encrypted file
    Output: Keywords Found "Result = 1", otherwise "0"

result = 1
    For each encrypted keyword "i" {
        For each encrypted word "j" in the file {
            match = EncWordMatch(FileWordⱼ, Keywordᵢ)
            result += match
        }
    }
    Return result
```

FIG. 16

| Item | Specification |
|---|---|
| CPU | Intel Core-i7 5930K |
| # of CPU Cores | 4 |
| # of Threads | 8 |
| CPU Frequency | 3.5 GHz |
| Cache Size | 15 MB |
| System Memory | 32 GB DDR4 |
| Operating System | Windows 8.1 Ultimate 64-bits |
| Programming IDE | Visual Studio 2012 Ultimate edition |
| GPU | NVIDIA GeForce GTX980 |
| Maxwell Version | GM204 |
| # of CUDA Cores | 2048 |
| GPU Core Frequency | 1126 MHz |
| GPU Memory | 4 GB |
| GPU L2 Cache | 2 MB |

|  | This Work | | IBM HElib | GPU Speedup over IBM HElib | Naehrig et al. (time) | Naehrig et al. (speedup) |
| --- | --- | --- | --- | --- | --- | --- |
|  | CPU | GPU |  |  |  |  |
| Startup | 0.27 | 0.27 | 85.3 | 316× | 5 | 18.5× |
| Encrypt | 0.383 | 0.023 | 0.59 | 25.6× | 4.8 | 208.7× |
| Decrypt | 0.3 | 0.005 | 0.39 | 78× | 2.27 | 454× |
| Add | 0.006 | $18 \times 10^{-6}$ | 0.002 | 111× | 0.013 | 722× |
| Multiply | 0.372 | 0.003477 | 3.6 | 1035× | 126.25 | 36310× |

FIG. 22

|  | Present Invention | IBM HElib |
| --- | --- | --- |
| $SecurityLevel(\lambda)$ | 80 | 80 |
| $Depth(L)$ | 10 | 10 |
| Modulus Width (bits) | $log(q_1) = 31$ | $log(q_2) = 301$ |
| Poly. Degree [28] | $n > log(q)(\lambda + 110)/7.2$ | |
| $n$ | $n_1 = 1024$ | $n_2 = 13981$ |
| Ctxt size (bits) | $4 \cdot n_1 \cdot log^2(q_1)$ $\approx 3.9$ Million | $2 \cdot n_2 \cdot log(q_2)$ $\approx 6$ Million |

FIG. 23

$$A_{1\times 2} \cdot s_{2\times 1} = b - a \cdot t = e$$

FIG. 25a $$C_{N\times 2} = \mu \cdot \mathrm{BDI}(I_{N\times N}) + r_{N\times 1} \cdot A_{1\times 2} + E_{N\times 2}$$

FIG. 25b $$\begin{aligned}
C_{N\times 2} \cdot s_{2\times 1} &= (\mu \cdot \mathrm{BDI}(I_{N\times N}) \\
&\quad + r_{N\times 1} \cdot A_{1\times 2} + E_{N\times 2}) \cdot s_{2\times 1} \\
&= \mu \cdot \mathrm{BDI}(I_{N\times N}) \cdot s_{2\times 1} \\
&\quad + r_{N\times 1} \cdot A_{1\times 2} \cdot s_{2\times 1} + E_{N\times 2} \cdot s_{2\times 1} \\
&= \mu \cdot \mathrm{BDI}(I_{N\times N}) \cdot s_{2\times 1} \\
&\quad + r_{N\times 1} \cdot e + E_{N\times 2} \cdot s_{2\times 1} \\
&= \mu \cdot \mathrm{BDI}(I_{N\times N}) \cdot s_{2\times 1} + error
\end{aligned}$$

FIG. 25c $$\begin{aligned}
\mathrm{BD}(C) \cdot D \cdot s &= \mathrm{BD}(C) \cdot (\mu_2 \cdot \mathrm{BDI}(I) + r_2 \cdot A + E_2) \cdot s \\
&= \mathrm{BD}(C) \cdot (\mu_2 \cdot \mathrm{BDI}(I) \cdot s + r_2 \cdot e + E_2 \cdot s) \\
&= \mu_2 \cdot C \cdot s + \mathrm{BD}(C) \cdot (r_2 \cdot e + E_2 \cdot s) \\
&= \mu_2 \cdot (\mu_1 \cdot \mathrm{BDI}(I) \cdot s + r_1 \cdot e + E_1 \cdot s) \\
&\quad + \mathrm{BD}(C) \cdot (r_2 \cdot e + E_2 \cdot s) \\
&= \mu_2 \cdot \mu_1 \cdot \mathrm{BDI}(I) \cdot s + \mu_2 \cdot (r_1 \cdot e + E_1 \cdot s) \\
&\quad + \mathrm{BD}(C) \cdot (r_2 \cdot e + E_2 \cdot s) \\
&= \mu_2 \cdot \mu_1 \cdot \mathrm{BDI}(I) \cdot s + \mu_2 \cdot error_1 \\
&\quad + \mathrm{BD}(C) \cdot error_2 \\
&= \mu_2 \cdot \mu_1 \cdot \mathrm{BDI}(I) \cdot s + error
\end{aligned}$$

FIG. 25d $$F(x_1, \ldots, x_v) = \sum_{(y_1, \ldots, y_v) \in S} \left( \prod_{i=1}^{v} \overline{(x_i \oplus y_i)} \right)$$

FIG. 25e $$\text{error}_f(B, n, q) < q/2$$

FIG. 25f $$n > \log q(\lambda + 110)/7.2$$

FIG. 25g $$p = \frac{p_{w_1} p_{w_2} \cdots p_{w_K}}{p_{w_1} p_{w_2} \cdots p_{w_K} + (1 - p_{w_1})(1 - p_{w_2}) \cdots (1 - p_{w_K})}$$

FIG. 25h $$\eta \triangleq \log(1 - p) - \log p = \sum_{i=1}^{K} (\log(1 - p_{w_i}) - \log p_{w_i})$$

FIG. 25i $$\eta_{w_i} \triangleq \log(1 - p_{w_i}) - \log p_{w_i}$$

FIG. 25j $$T(a_1, a_2, a_3, a_4) = a_1(a_3 \cdot L_5 + (1 - a_3) \cdot L4)$$
$$+ (1 - a_1)(a_2(a_4 \cdot L_3 + (1 - a_4) \cdot L_2)$$
$$+ (1 - a_2) \cdot L_1)$$

FIG. 25k $$X(k) = \sum_{n=0}^{N-1} x(n) W^{-n(2k+1)} \quad, 0 \leq k < N$$

FIG. 25l $$x(n) = \frac{1}{N} \sum_{k=0}^{N-1} X(K) W_N^{-n(2k+1)} \quad, 0 \leq n < N$$

FIG. 25m $$a = a_1 \cdot 2^\ell + a_0$$

FIG. 25n $$a \bmod q = a_0 - a_1 + (a_1 << 17)$$

FIG. 25o

SYSTEMS, DEVICES, AND PROCESSES FOR HOMOMORPHIC ENCRYPTION

CROSS-REFERENCE TO RELATED APPLICATIONS

This application claims the benefit of U.S. 61/946,557, filed on Feb. 28, 2014, the entirety of which is incorporated herein by reference.

FIELD

This disclosure relates to encryption, more specifically, to homomorphic encryption.

BACKGROUND

A fully homomorphic encryption scheme (FHE) is an encryption scheme that allows evaluation of arbitrary functions on encrypted data. Since Gentry's mathematical breakthrough constructing the first plausible FHE scheme, there has been rapid development in the theory and implementation of homomorphic encryption (HE) schemes. HE schemes can now be based on a variety of cryptographic assumptions, such as approximate greatest common divisors, learning with errors (LWE), and Ring-LWE (RLWE).

Known implementations RLWE-based FHE schemes have drawbacks, such as the need to maintain a so-called "modulus chain" which increases the size of prime numbers and consequently increases the ring dimension for a given security level. They also often need to perform processing intensive modulus and key switching operations.

Searching an encrypted database is generally known, but often has drawbacks, such as the need for a special key to aid the server in performing a search request. In some cases, partial information about the data access pattern is leaked. In some cases, the same server requests would generate the same tags.

In general, known fully homomorphic encryption systems require a large amount of storage space and a high degree of processing power. As such, known systems are cumbersome and not widely used. Other drawbacks of conventional systems are known to those skilled in the art.

SUMMARY

According to one aspect of the present invention, a process for homomorphic encryption includes receiving a ciphertext, the ciphertext corresponding to a plaintext polynomial bound to a message space of a polynomial-based fully homomorphic cryptographic scheme. The process further includes performing a multiplication operation on the ciphertext to obtain a resultant ciphertext by performing a bitwise decomposition function on the ciphertext to obtain a bitwise decomposed ciphertext, the bitwise decomposition function mapping a multi-bit data type to a sequence of bits, and by performing matrix multiplication on the bitwise decomposed ciphertext and a data element that accords with an inverse bitwise decomposition of the ciphertext. The inverse bitwise decomposition maps a sequence of bits to the multi-bit data type. The process further includes outputting the resultant ciphertext.

The process can further include performing an addition operation on the ciphertext by performing matrix addition on the ciphertext and another data element.

The process can further include receiving, via a network from a remote terminal, a plurality of ciphertexts that includes the ciphertext. Each ciphertext of the plurality of the ciphertexts is representative of a portion of a human-intelligible electronic message. The process can further include performing the multiplication operation on each ciphertext of the plurality of the ciphertexts for each data element of a set of data elements that includes the data element. The set of data elements defines a set of message filter trigger words.

Performing the multiplication operation on each ciphertext and each data element can include multiplicatively accumulating a bitwise match of each ciphertext and each data element.

Multiplicatively accumulating the bitwise match can include performing a homomorphic XNOR operation on respective bits of each ciphertext and each data element.

The process can further include accumulating a ciphertext probability by performing matrix addition to sum results of each multiplication operation, the resultant ciphertext being representative of the ciphertext probability. The process can further include outputting the resultant ciphertext via the network to a messaging server or a destination remote terminal for the human-intelligible electronic message. The messaging server or the destination remote terminal is configured to decrypt the resultant ciphertext to obtain a resultant plaintext polynomial and to interpret the resultant plaintext polynomial as a probability that the human-intelligible electronic message should be filtered.

The process can further include storing the set of data elements as binary hashes in ascending order and skipping redundant computations based on stored partial results for adjacent data elements.

The process can further include performing the multiplication operation for the ciphertext and each data element of a set of data elements that includes the data element. The process can further include performing matrix addition to sum results of each multiplication operation. The set of data elements defines a set of stored data and the ciphertext is representative of a search query for the set of stored data.

The process can further include outputting the resultant ciphertext via a network to a remote terminal. The remote terminal is configured to decrypt the resultant ciphertext to obtain a resultant plaintext polynomial and to compare the resultant plaintext polynomial to an error threshold to obtain a value for a binary flag defined by the error threshold.

The data element can be representative of another ciphertext that corresponds to another plaintext polynomial bound to the message space.

The multiplication operation can further include performing number theoretic transform (NTT) computations. The process can further include distributing each number theoretic transform computation among a plurality of processing cores.

The process can further include using a graphics processing unit (GPU) to perform the multiplication operation.

According to another aspect of the present invention, a process for homomorphic encryption includes computing a plaintext polynomial bound to a message space of a polynomial-based fully homomorphic cryptographic scheme and storing an identity matrix of the polynomial-based fully homomorphic cryptographic scheme in accordance with an inverse bitwise decomposition. The inverse bitwise decomposition maps a sequence of bits of the identity matrix to a multi-bit data type. The process further includes generating an expanded plaintext polynomial by performing matrix multiplication on the plaintext polynomial and the representation of the identity matrix and computing a ciphertext corresponding to the plaintext polynomial by applying a public key to the expanded plaintext polynomial.

The process can further include performing a multiplication operation on the ciphertext to obtain a resultant ciphertext. The multiplication operation includes performing a bitwise decomposition function on the ciphertext to obtain a bitwise decomposed ciphertext, the bitwise decomposition function mapping the multi-bit data type to a sequence of bits. The multiplication operation further includes performing matrix multiplication on the bitwise decomposed ciphertext and a data element.

The process can further include performing an addition operation on the ciphertext to obtain a resultant ciphertext. Performing the addition operation includes performing matrix addition on the ciphertext and a data element.

The process can further include sending the ciphertext to a remote system via a computer network, the remote system configured to perform an operation on the ciphertext to obtain a resultant ciphertext, and receiving the resultant ciphertext from the remote system.

The process can further include decrypting the resultant ciphertext to obtain a resultant plaintext polynomial by performing a matrix multiplication on the resultant ciphertext and a secret key that is complementary to the public key. The secret key is not expanded by a powers-of-two expansion.

The process can further include mapping a binary flag to an error threshold, comparing the resultant plaintext polynomial to the error threshold to obtain a value for the binary flag.

According to another aspect of the present invention, a system for homomorphic encryption includes a plurality of remote terminals. Each remote terminal of the plurality of remote terminals is configured to generate ciphertexts from plaintext polynomials. Each ciphertext corresponds to a plaintext polynomial bound to a message space of a polynomial-based fully homomorphic cryptographic scheme. The system further includes at least one server configured to receive ciphertexts via a network from the plurality of remote terminals. The at least one server is further configured to perform a multiplication operation and an addition operation on the ciphertexts to obtain resultant ciphertexts. The multiplication operation includes performing a bitwise decomposition function on a ciphertext to obtain a bitwise decomposed ciphertext. The bitwise decomposition function maps a multi-bit data type to a sequence of bits. The multiplication operation further includes performing matrix multiplication on the bitwise decomposed ciphertext and a data element belonging to a set of data elements. The data element is in accordance with an inverse bitwise decomposition of the ciphertext. The inverse bitwise decomposition mapping a sequence of bits to the multi-bit data type.

The at least one server can further be configured to output the resultant ciphertexts via the network.

Sequences of ciphertexts can be representative of human-intelligible electronic messages delivered among the plurality of remote terminals and the set of data elements can be representative of message filter trigger words. The at least one server can further be configured to perform the multiplication operation on combinations of ciphertexts and data elements and sum results of several multiplication operations to obtain resultant ciphertexts representative of probabilities that the human-intelligible electronic messages should be filtered.

Ciphertexts can be representative of search queries and the set of data elements can be representative of stored data to be searched. The at least one server can be further configured to perform the multiplication operation on combinations of ciphertexts and data elements and to sum results of several multiplication operations to obtain resultant ciphertexts representative of resultant plaintext polynomials that are comparable to an error threshold to obtain values for a binary search-hit flag defined by the error threshold.

The at least one server can further include a plurality of processing cores. The at least one server can be further configured to distribute a number theoretic transform (NTT) computation among the plurality of processing cores as part of the multiplication operation.

The at least one server can further include a graphics processing unit (GPU) configured to perform the multiplication operation and the addition operation.

According to another aspect of the present invention, a process for message filtering with homomorphic encryption includes receiving, via a network from a remote terminal, a plurality of ciphertexts corresponding to a plurality of plaintext polynomials bound to a message space of a polynomial-based fully homomorphic cryptographic scheme. Each ciphertext of the plurality of the ciphertexts is representative of a portion of a human-intelligible electronic message originating from the remote terminal. The process further includes performing multiplication operations on each ciphertext of the plurality of the ciphertexts for each data element of a set of data elements. The set of data elements defines a set of message filter trigger words. Each multiplication operation includes multiplicatively accumulating a bitwise match of each ciphertext and each data element. The process further includes outputting at least one resultant ciphertext resulting from the multiplication operations.

Multiplicatively accumulating the bitwise match can include performing a homomorphic XNOR operation on respective bits of each ciphertext and each data element.

The process can further include accumulating a ciphertext probability by performing matrix addition to sum results of each multiplication operation, the resultant ciphertext being representative of the ciphertext probability, and outputting the resultant ciphertext for decryption to obtain a resultant plaintext polynomial representative of a probability that the human-intelligible electronic message should be filtered.

The message filter trigger words can be spam trigger words and the resultant ciphertext can be representative of a probability that the human-intelligible electronic message is spam.

The message filter trigger words can be security trigger words and the resultant ciphertext can be representative of a probability that the human-intelligible electronic message is a security concern.

BRIEF DESCRIPTION OF THE DRAWINGS

The drawings illustrate, by way of example only, embodiments of the present disclosure.

FIG. 3 is a chart showing secret key size reduction.

FIG. 4 is a chart showing ciphertext size reduction and obviating a flatten function.

FIG. 5 shows pseudocode for a ciphertext multiplication operation.

FIG. 6 is a table of example parameter selection.

FIG. 8 shows pseudocode for an encryption process.

FIG. 9 shows pseudocode for a message filtering process.

FIG. 10 shows pseudocode for a word matching process.

FIG. 11 shows pseudocode for an encrypted word matching process.

FIG. 16 shows pseudocode for a multiple keyword search function.

FIGS. 20-24 show example results of the present invention.

FIGS. 25a-25o show expressions/equations according to the present invention.

DETAILED DESCRIPTION

The techniques of the present invention are described with reference components such as systems, devices, terminals, servers, functions, as well as other components such as data structures and equations. It should be understood that a component described in terms of hardware may include some programmatic code, and that a component described in terms of code, processes, or functions may include hardware elements. The specific examples described herein are not intended to be limiting.

Discussed herein are techniques for homomorphic encryption and decryption, key generation, secure email spam filters, secure keyword searches, binary decision trees, and among others. The principles of Gentry-Sahai-Waters (GSW) homomorphic encryption are leveraged where practical. However, the present techniques offer distinct improvements over GSW homomorphic encryption.

Figure 1:
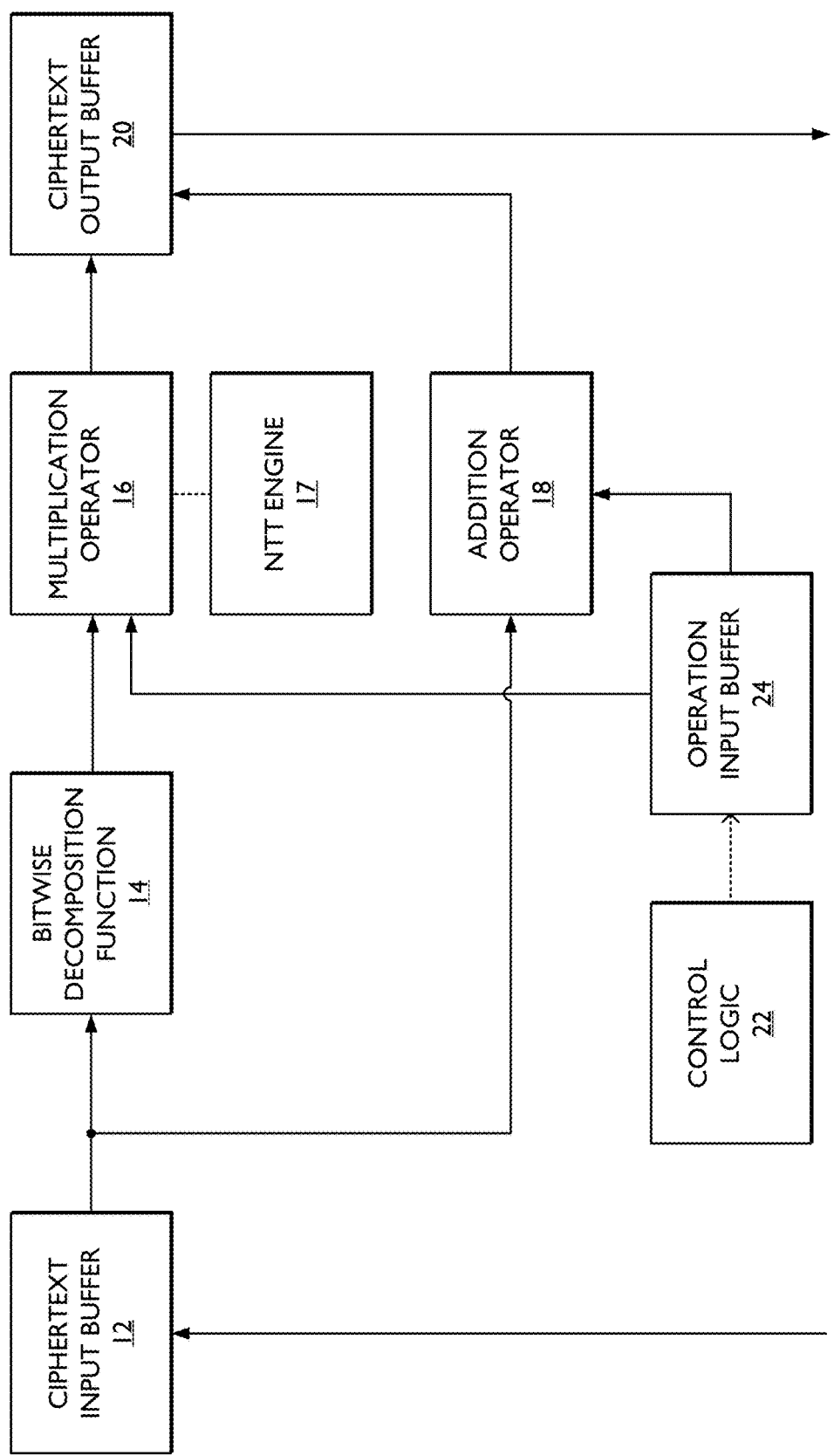
FIG. 1 is a block diagram of a device configured to implement operation processes for homomorphic encryption.

FIG. 1 shows a block diagram of a device 10 configured to implement operation processes for homomorphic encryption as described herein. The device 10 can be included as part of a server that communicates with remote terminals via a network and performs computations on encrypted data received from such remote terminals. The device 10 can be included as part of a terminal or other computer to perform computations on encrypted data at such terminal. The device 10 can be realized as code executable on a processing machine, such as a graphics processing unit (GPU), as logic gates and other blocks of an application-specific integrated circuit (ASIC), as a combination of such, or similar. It is noted that the blocks shown in FIG. 1 are examples, and the structure and functionality of various blocks can be combined, separated, or implemented in ways different from shown.

The examples described herein employ a ring learning with errors (RLWE) cryptographic scheme. However, this is merely one example, and any suitable polynomial-based fully homomorphic cryptographic scheme can be used.

The device 10 includes a ciphertext input buffer 12, a bitwise decomposition function 14, a multiplication operator 16, a number theoretic transform (NTT) engine 17, an addition operator 18, a ciphertext output buffer 20, and control logic 22. The device 10 may further include an operation input buffer 24. A ciphertext as discussed herein corresponds to a plaintext polynomial that is bound to a message space of the polynomial-based fully homomorphic cryptographic scheme.

The ciphertext input buffer 12 is a memory space that stores input ciphertext to undergo computation. The ciphertext input buffer 12 can store one or more ciphertexts. The ciphertext input buffer 12 may be a sequential buffer, such as a first-in first-out (FIFO) buffer or may have a different structure. Input to the ciphertext input buffer 12 may be from a network interface coupled to a remote terminal via a network (e.g., the Internet) or may be from a storage device local to the device 10. Input via the network may be the case when the device 10 is implemented at a server. Additionally, input to the ciphertext input buffer 12 may include feedback from the ciphertext output buffer 20. The ciphertext input buffer 12 and ciphertext output buffer 20 may share memory space or may designate a common memory space, with reads and writes being controlled by the control logic 22.

The bitwise decomposition function 14 is configured to process an input ciphertext to obtain a bitwise decomposed ciphertext. The bitwise decomposition function maps a multi-bit data type (e.g., integer) to a sequence of bits. Ciphertext contains data representative of vectors and the bitwise decomposition function 14 is configured to obtain binary representations of such vectors. The bitwise decomposition function 14 can be considered to expand ciphertext stored in accordance with the multi-bit data type into bits that may then readily undergo matrix multiplication. The bitwise decomposition function 14 will be discussed in further detail below.

The multiplication operator 16 is configured to perform a matrix multiplication computation on bitwise decomposed ciphertext and a data element received from the operation input buffer 24. The data element is in accordance with an inverse bitwise decomposition of the ciphertext. The inverse bitwise decomposition maps a sequence of bits to the multi-bit data type. The multiplication operator 16 uses the NTT engine 17. Matrix multiplication and the NTT engine 17 will be discussed in further detail below.

The addition operator 18 is configured to perform a matrix addition computation on input ciphertext and a data element received from the operation input buffer 24. Matrix addition will be discussed in further detail below.

The ciphertext output buffer 20 stores one or more resultant ciphertexts resulting from computations performed by the operators 16, 18. The ciphertext output buffer 20 is otherwise generally the same as the ciphertext input buffer 12. Output of the ciphertext output buffer 20 can be fed back for further computations. Output may also be sent to long-term memory of the device 10 or transmitted to a remote terminal on the network. Routing of the output of the ciphertext output buffer 20 is governed by the control logic 22.

The control logic 22 is configured to manage operations of the device 10 based on the application of the device 10. The control logic 22 can be configured to forward data elements and respective operation commands (e.g., multiply, add) from the operation input buffer 24 and advances ciphertext from the ciphertext input buffer 12 to the respective operator 16, 18. Additionally or alternatively, the control logic 22 can be configured to feedback resultant ciphertext from the ciphertext output buffer 20, as well as respective operation commands, to the respective operator 16, 18. The control logic 22 can be programmable to execute program code to facilitate a sequence of operations based on one or more elementary operations (e.g., multiply, add) capable of being performed by the device 10. Alternatively or additionally, the control logic 22 can be based on fixed logic gates or other blocks.

The operation input buffer 24 is a memory space that stores input data elements to facilitate computation. The operation input buffer 24 can store one or more of such input data elements. Input to the operation input buffer 24 may be from a database, which may be available locally to the device 10 or through the network interface via a network (e.g., the Internet). Input to the operation input buffer 24 may additionally or alternatively include data from a remote terminal. The operation input buffer 24 is otherwise generally the same as the ciphertext input buffer 12. Further, it is contemplated that input data elements may be plaintext, ciphertext, or a combination of such.

In operation, the device 10 receives ciphertexts at the ciphertext input buffer 12 and performs multiplication and/or addition operations on the received ciphertexts to obtain resultant ciphertexts. The multiplication operation includes performing the bitwise decomposition function 14 on input ciphertexts and performing matrix multiplication on bitwise decomposed ciphertexts and input data elements at the multiplication operator 16. The addition operation includes performing matrix addition on input ciphertexts and input data elements at the addition operator 18. Resultant ciphertexts at the ciphertext output buffer 20 can be stored, transmitted, fed back into computations, or any combination of such.

Figure 2:
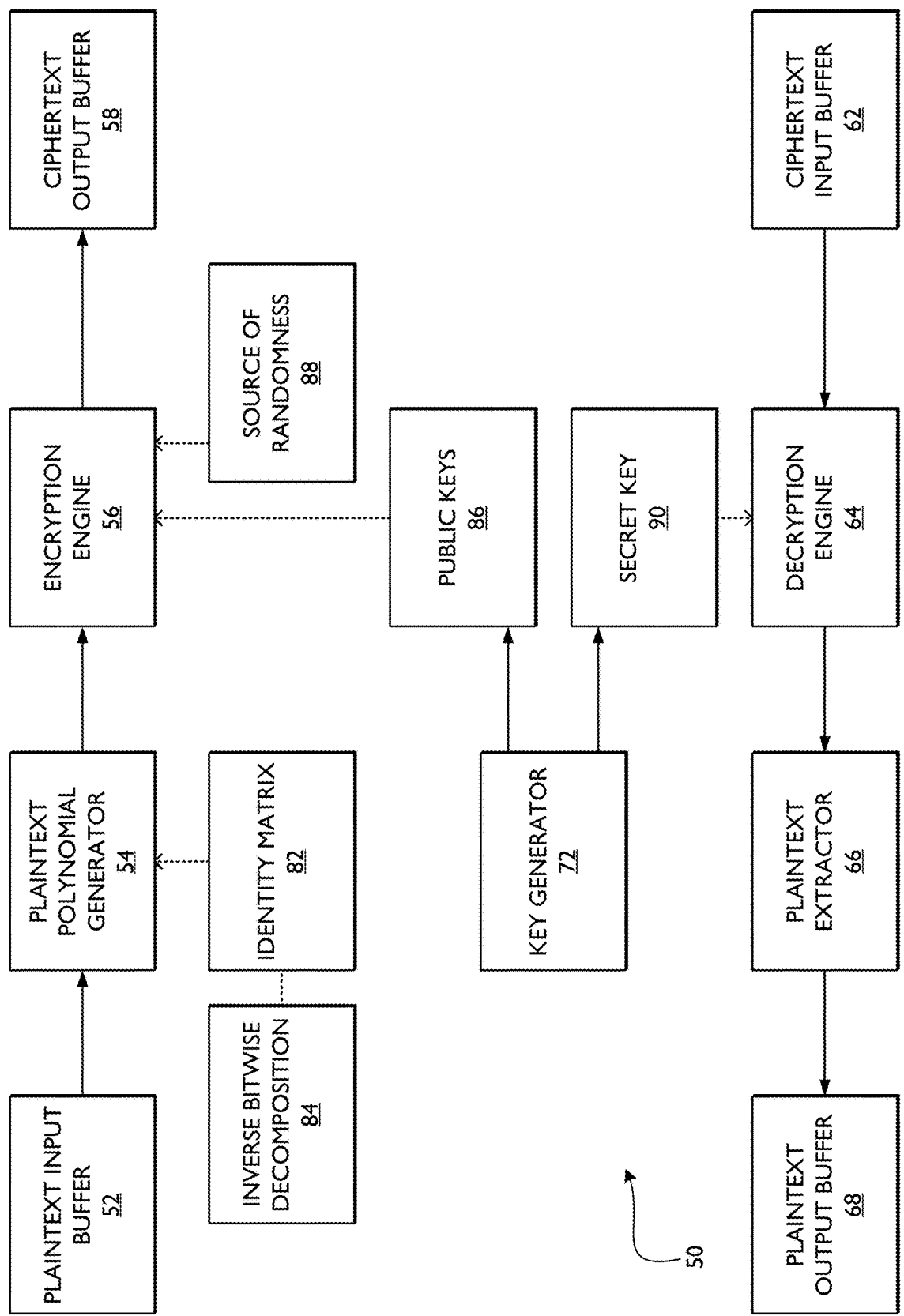
FIG. 2 is a block diagram of a device configured to encrypt and decrypt data.

FIG. 2 shows a block diagram of a device 50 configured to implement encryption/decryption processes for homomorphic encryption as described herein. The device 50 can be included as part of a terminal or other computer. The device 50 can be configured to communicate with a server that performs computations on encrypted data received from the device 50. Alternatively, the device 50 can be located at the same terminal at which the device 10 is located to perform encryption, computation, and decryption locally at the same terminal. The device 50 can be realized as code executable on a processing machine, such as a GPU, as logic gates and other blocks of an ASIC, as a combination of such, or similar. It is noted that the blocks shown in FIG. 2 are examples, and the structure and functionality of various blocks can be combined, separated, or implemented in ways different from shown.

The device 50 includes an encryption system that includes a plaintext input buffer 52, a plaintext polynomial generator 54, an encryption engine 56, and a ciphertext output buffer 58. The device 50 further includes a decryption system that includes a ciphertext input buffer 62, a decryption engine 64, a plaintext extractor 66, and a plaintext output buffer 68. The device 50 further includes a key generator 72. In various implementations, other devices include one or more of the encryption system, decryption system, and key generator. For sake of example, the device 50 includes all of these components. Operations of the device 50 are controlled by a central processing unit (CPU) or similar controller operating under control of at least one process such as a user program.

The plaintext input buffer 52 is a memory space that stores input plaintext to be encrypted. The plaintext input buffer 52 can store one or more plaintexts. The term plaintext as used herein denotes an arbitrary series of binary values. Sources of plaintext include a messaging application, such as an email client, a search application, and similar. The plaintext input buffer 52 may be a sequential buffer, such as FIFO buffer or may have a different structure.

The plaintext polynomial generator 54 is configured to compute plaintext polynomials bound to the message space of the polynomial-based fully homomorphic cryptographic scheme. This is described further below. Further, the plaintext polynomial generator 54 generates an expanded plaintext polynomial by performing matrix multiplication on the plaintext polynomial and an identity matrix 82 of the polynomial-based fully homomorphic cryptographic scheme. The identity matrix 82 accords with an inverse bitwise decomposition 84 that maps a sequence of bits of the identity matrix 82 to a multi-bit data type (e.g., integer). This can advantageously result in smaller ciphertexts. The inverse bitwise decomposition 84 is discussed in further detail below.

The encryption engine 56 is configured to encrypt the expanded plaintext polynomials based on one of any number of public keys 86 and a source or randomness 88. The public keys 86 may be stored in memory at the device 50 or may be fetched from a remote source. The specific public key 86 used in a particular encryption is selected based on the intended recipient of the plaintext, as is known. The source of randomness 88 can be user entropy, physically based entropy, or other source.

The ciphertext output buffer 58 receives ciphertexts from the encryption engine 56. The device 50 may be configured to reference the ciphertext output buffer 58 for transmitting ciphertexts to a server, for storing ciphertexts at long-term storage at the device 50, or for other functions.

During homomorphic encryption, the device 50 computes plaintext polynomials at the plaintext polynomial generator 54 based on input plaintext 52 from the input buffer 52. Expanded plaintext polynomials are generated by the plaintext polynomial generator 54 based on the identity matrix in accordance with the inverse bitwise decomposition 84. Ciphertexts are computed by the encryption engine 56 by applying a selected public key 86 and the source of randomness 88 to the expanded plaintext polynomials, before being output at the buffer 58.

Concerning decryption, the ciphertext input buffer 62 is configured to receive incoming ciphertexts from, for example, a server or locally from long-term memory.

The decryption engine 64 is configured to decrypt ciphertexts using a secret key 90 that is paired with one of the public keys 86. The secret key and public key pair is contemplated to be controlled by the same user, as is known.

The plaintext extractor 66 is configured to extract plaintext from plaintext polynomials resulting from the decryption engine 64.

The plaintext output buffer 68 stores extracted plaintext 68 for use by the terminal containing the device 50, such as for responding to a user's search query, outputting human-intelligible electronic messages, or similar.

The buffers 52, 58, 62, 68 may be of the same or different configurations and may share memory space or may designate a common memory space.

The key generator 72 is configured to generate a public key 86 and complementary secret key 90. The secret key 90 does not use a powers-of-two expansion. This advantageously results in a smaller secret key 90. This will be discussed in further detail below.

The examples described herein employ a RLWE cryptographic scheme, and the general principles of such scheme will now be described. However, this scheme is not particularly limiting and other suitable polynomial-based fully homomorphic cryptographic scheme(s) can be used. Moreover, any gaps in the below would be well understood by those skilled in cryptography in view of the known art.

For an odd prime number q, the ring Z/qZ (or $Z_q$) with the interval (−q/2, q/2)∩Z is identified. The notation $[x]_q$ denotes reducing x modulo q. The examples discussed herein use polynomial rings defined by the cyclotomic polynomials R=Z[X]/$\Phi_m$(X), where $\Phi$m(X)=$x_n$+1 is the irreducible $m^{th}$ cyclotomic polynomial, in which n is a power of 2 and m=2n. Let $R_q$=R/qR. Any type of multiplication including matrix and polynomial multiplication is denoted herein by the multiplication operator '·'. Addition, denoted herein by '+', is entry-wise. Generally, operations are done in finite field and as ring operations. Rounding up to the nearest integer is denoted by [a]. Matrices of rings are defined as $A_{M\times N}$, where $A_{ij} \in R_q$ and M, N are the matrix dimensions. $I_{N\times N}$ represents the identity matrix of rings. Row vectors are represented as [a b], where a and b are the vector elements. Column vectors on the other hand are represented as [a; b].

The RLWE problem concerns a mapping of the LWE problem from the vectors over $Z_q$ to polynomial rings over $R_q$. The RLWE problem is to distinguish between the following two distributions. The first distribution is to draw (a, b) uniformly from $R_q^2$. The second is to first draw t uniformly from $R_q$. Then sample (a, b) as follows. Draw a uniformly from $R_q$, sample e from a discrete Gaussian error distribution e←$D_{R_q,\sigma}$, and set b=a·t+e.

The parameters of the cryptographic scheme are n, the degree of the number field; q, the modulus; $\sigma_k$ and $\sigma_c$, the standard deviation of the discrete Gaussian error distribution in the keyspace and ciphertext space, respectively; $\ell \triangleq \lceil \log q \rceil$; and N=2$\ell$ that governs the number of ring elements in a ciphertext. The setting of these parameters depends on the security level λ (e.g., λ=80 or 128 bits) as well as the complexity of functions contemplated to evaluate on ciphertexts.

The bitwise decomposition function 14 (FIG. 1), also termed a bit decompose function BD(d), is configured to transform the polynomial d to the $\ell$-dimensional vector [d(0), . . . , d($\ell$−1)], which are the bitwise decomposition of d. That is, d(0), . . . , d($\ell$−1) are polynomials with {0-1} coefficients such that d=$\sum_{\tau=0}^{\ell-1}$ d(τ)·$2^\tau$, which represents the inverse bitwise decomposition 84 (FIG. 2) and which can be represented as a bit decompose inverse function BDI(d). Note that $A_{N\times N}$=BD($B_{N\times 2}$), inversely $B_{N\times 2}$=BDI($A_{N\times N}$), and that BD($B_{N\times 2}$)·BDI($A_{N\times N}$)=$A_{N\times N}$·$B_{N\times 2}$.

Referring back to FIG. 2, the device 50 is configured to generate keys, encrypt information, and decrypt information.

The key generator 72 is configured to implement a Keygen($1^\lambda$) function as follows. A polynomial t←$D_{R_q,\sigma_k}$ is chosen. The secret key 90 becomes sk=$s_{2\times 1}$←[1; −t]∈$R_q^2$. The public key is pk=$A_{1\times 2}$=[b a], based on a uniform sample a←$R_q$, e←$D_{R_q,\sigma_k}$, set b=a·t+e. It is noted that the expression in FIG. 25A holds.

As shown in FIG. 3, this is advantageous over a known secret key sk=v=PO2(s) based on a powers-of-two expansion such as PO2(x) defined as [x, 2x, . . . , $2^{\ell-1}$x]. Hence, the key generator 72 generates smaller secret keys by a theoretical factor of $\ell$ times.

The encryption engine 56 is configured to implement an Enc(pk, μ) function as follows. The message space is $R_q$. A uniform vector $r_{N\times 1}$ is sampled where each coefficient in the polynomials in r sampled from {0,1}, $E_{N\times 2}$←$D_{R_q,\sigma_c}^{N\times 2}$. The plaintext polynomial μ∈$R_q$ is encrypted by calculating the expression in FIG. 25b. As shown in FIG. 4, this is advantageous over prior techniques that use $C_{N\times N}$, as the encryption engine 56 results in smaller ciphertext by a theoretical factor of $\ell$ times.

The decryption engine 64 is configured to implement a Dec(sk, C) function as follows. Given the ciphertext C, the plaintext μ∈$R_q$ is restored by multiplying C by the secret-key s according to the expression in FIG. 25c.

This is advantageous over prior techniques that implement Dec(sk, C)=$C_{N\times N}$·$v_{N\times 1}$, as the decryption engine 64 requires the performance of fewer operations a theoretical factor of $\ell$ times.

It is noted that the first $\ell$ coefficients in the first term of the expression in FIG. 25c are in the form μ, 2μ, . . . , $2^{\ell-1}$μ. This means that the element at location i∈[0,$\ell$−1] is in the form μ·$2^i$+error. That is, the most significant bit of each entry carries a single bit from the number μ assuming that error<q/2 and there is theoretically no wrap-around mod q as may be found in prior techniques.

Referring back to FIG. 1, the device 10 is configured to perform operations on ciphertext without first decrypting the ciphertext. For input ciphertexts $C_{N\times 2}$ and $D_{N\times 2}$ ∈$R_q^{N\times 2}$ encrypting $\mu_1$ and $\mu_2$ respectively, homomorphic operations are implemented as follows.

The addition operator 18 implements an ADD(C, D) function to add two ciphertexts $C_{N\times 2}$ and $D_{N\times 2}$ by performing the entry-wise addition $C_{N\times 2}$ D+$_{N\times 2}$.

The multiplication operator 16 and bitwise decomposition function 14 implement a MULT(C, D) function to multiply two ciphertexts $C_{N\times 2}$ and $D_{N\times 2}$ by performing the bitwise decomposition function 14 (or BD) on one ciphertext and then executing the multiplication, as BD($C_{N\times 2}$)·$D_{N\times 2}$.

As shown in FIG. 4, this is advantageous over prior techniques that define MULT(C, D)=FLATTEN($C_{N\times N}$·$D_{N\times N}$), where FLATTEN(A) is defined as BD(BDI(A)). The present technique requires fewer operations by a theoretical factor of at least $\ell$ times. The resource-intensive flatten operation is not required to be performed.

Correctness of the above homomorphic addition should readily apparent to those skilled it the art. The multiplication is asymmetric in the input ciphertexts C and D. That is, the components of D are treated as a whole, whereas the components of C are broken up into their bit-wise decompositions. The multiplication is correct, as discussed below, and gives a slow noise-growth result.

The correctness of the multiplication operation should readily apparent to those skilled it the art in view of the expression in FIG. 25d, in which matrix dimensions are removed for clarity. In the last line of the manipulation of expression in FIG. 25d, it is apparent that the encryption of μ=$\mu_2 \cdot \mu_1$.

Correct decryption depends on the ciphertext noise being bounded. Thus, it is important to understand how homomorphic operations increase ciphertext noise. Taking C as a fresh ciphertext, it is apparent that homomorphic addition of v ciphertexts increases the noise by a factor of v in the worst case. In various contemplated implementations, since the coefficients of the error polynomials are contemplated to follow a Gaussian distribution, the factor is closer to $O(\sqrt{v})$.

It is further apparent that homomorphic multiplication of two ciphertexts C=Enc($\mu_1$) and D=Enc($\mu_2$) with error magnitudes $B_1$ and $B_2$, respectively, increases the error to O(B1·$\|\mu_2\|_1$+B2·n log q) in the worst case, and O(B1·$\|\mu_2\|_1$+ $B^2 \cdot \sqrt{n\log(q)}$) in various contemplated implementations. Here, $\|\mu\|_1$ denotes the $\ell_1$ norm of the message polynomial μ. It is advantageous that error dependence on the two ciphertexts is asymmetric, as evident from the above.

To multiply v ciphertexts the order of multiplication is contemplated to play a role in the error. In techniques described herein, input µ will typically be 0 or 1, meaning that the growth is simply additive with respect to $B_1$. Thus, it is advantageous to multiply v ciphertexts with (the same) error level B is through an accumulator-like function as shown in FIG. 5, rather than using a binary tree of multiplications, which tends to grow error at superpolynomial rates. The resulting error growth is $O(B \cdot vn \log(q))$ in the worst case, and $O(B \cdot \sqrt{vn\log(q)})$ in various contemplated implementations. Hence, the control logic 22 (FIG. 1) can be configured to implement accumulative multiplications, as shown in FIG. 5 and as required by various contemplated implementations.

For example, reference is now made to the expression in FIG. 25e, in which $x_1, \ldots, x_v$ are v-tuples of input encrypted bits, $y_1, \ldots, y_v$ are v-tuples of bits in some set S, and operation $(x_i \oplus y_i)$ represents binary XNOR between bits $x_i$ and $y_i$. Since the form of the expression in FIG. 25e stipulates that exactly one of the terms may survive (F=1 when $x_1, \ldots, x_v \in S$, otherwise F=0), the small total error growth can result, even though the component computing based on the expression in FIG. 25e may not be able to determine precisely which term will survive.

It is apparent that noise grows to $O(B \cdot vn \log q \cdot |S|)$ in the worst case, or $O(B \cdot \sqrt{vn\log(q)|S|})$ in various contemplated implementations. This is in contrast to $O(B \cdot (\sqrt{n\log(q)})^{log(v)}|S|)$ when using the known Brakerski-Gentry-Vaikuntanathan encryption scheme, implemented in IBM HElib. Indeed, such expressions, as in the expression in FIG. 25e, are far from atypical, and they occur quite naturally in evaluating decision trees and PIR-like functions as will be discussed further below.

Another source of improvement afforded by the presently disclosed techniques is evident from the error term $B_1 \cdot \|\mu_2\|_1 + B_2 \cdot n \log q$. When multiplication is performed using an accumulator, as shown in FIG. 5, $B_2$ represents the smaller error in the fresh ciphertexts $C_i$, and $B_1$ represents the larger error in the accumulated ciphertext $C_{accum}$. If $C_i$ encrypts $\mu_2=0$, then the larger error term $B_1$ disappears from the error expression.

This error reduction is also apparent from the expression in FIG. 25e. When evaluating each of the products in the expression in FIG. 25e, the error can be seen to grow proportional not to v, the total number of multiplications, but rather with k, the longest continuous chain of 1's starting from the end. It is contemplated that this is because the last time a zero is encountered in the multiplication chain, the error is reduced, by the observation above. Assuming that S is an expected set, the expected length of a continuous chain of trailing 1's is $\Sigma_{i=1}^{v} i \cdot 2^i < 2$. In other words, the multiplicative factor of v disappears from the error expression as well, and error growth becomes close to $O(B \cdot \sqrt{n\log(q)|S|})$. This is substantially the same effect as if |S| ciphertexts were added.

Further, when $f$ is taken as a function to be evaluated, for example, the expression in FIG. 25e, the error$_f$(B,n,q) denotes how much the error grows when evaluating the function $f$ on ciphertexts in $R_q$ with an initial error of magnitude B. For correct decryption, it is expected that the expression in FIG. 25f holds. Since errors tend to grow slower using the present techniques, q can be set to be correspondingly smaller to meet a security level equivalent to that of prior techniques. Following the analysis of Lindner and Peikert, for a security level of λ bits, it is expected that the expression in FIG. 25g holds.

Because log q in the present techniques is smaller, n can be set to be smaller, for the same security level λ. In turn, a smaller n can result in a error$_f$(B,n,q) that is smaller, leading to an even smaller q, and so on. Suitable parameters are obtained by solving both the above inequalities in FIGS. 25f and 25g together. FIG. 6 summarizes an example of such a parameter selection.

Figure 7:
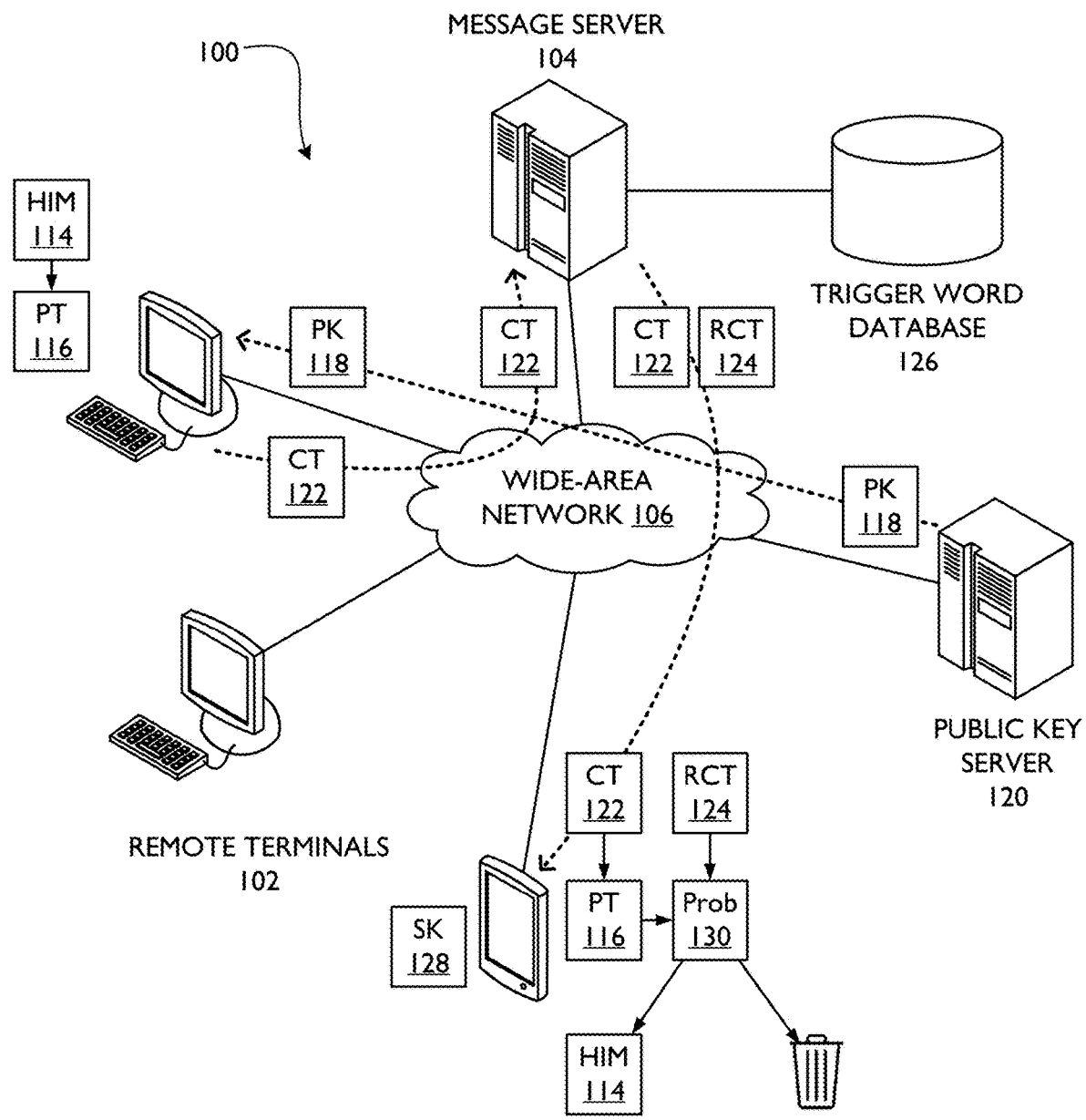
FIG. 7 is a schematic diagram of a messaging system.

With reference to FIG. 7, a human-intelligible messaging system 100 incorporating the present techniques is shown. The messaging system 100 can be an email system or similar messaging system that communicates electronic messages among users operating remote terminals 102, such as computers, smartphones, tablet devices, Internet-of-things (IoT) devices, smart-grid devices for power or other utility, medical devices, and the like. The messaging system 100 advantageously operates a spam filter that directly compares ciphertext to trigger words without decrypting ciphertext or having access to secret keys.

A message server 104, such as an email server, is configured to implement functionality of the device 10 of FIG. 1. That is, the message server 104 performs operations on received ciphertext messages and outputs resultant ciphertext messages. With respect to the messages that it handles, the message server 104 operates exclusively in the ciphertext domain.

Each of the remote terminals 102 is configured to implement functionality of the device 50 of FIG. 2. That is, a remote terminal 102 can execute a messaging client, such as an email application, that implements at least one of the encryption and decryption systems described with respect to FIG. 2. Each of the remote terminals 102 connects to the message server 104 via a wide-area network 106, such as the Internet.

Each of the remote terminals 102 is configured to receive input of human-intelligible messages 114, such as human-readable text, and segment human-intelligible messages 114 into units of plaintext 116. For instance, the remote terminal 102 can be configured to hash each word of a human-intelligible message 114 to a unique number of uniform bit length (e.g., 16 bits, 32 bits, or other value) to obtain a sequence of plaintexts 116 that represent the message 114. The remote terminal 102 is further configured to fetch, from a public key server 120 or other source, one or more public keys 118 belonging to the one or more intended recipients of a particular human-intelligible message 114, and using each such public key 118 to encrypt each of the plaintexts 116 of the message 114 into a ciphertext 122 as discussed elsewhere herein. It is contemplated that each human-intelligible word is represented by a sequence or group of ciphertexts, though this is not intended to be limiting. Each of the remote terminals 102 is further configured to send all of ciphertexts 122 representative of an original human-intelligible message 114 to the message server 104.

FIG. 8 shows pseudocode of a function that can be implemented in a remote terminal 102 to realize encryption as described the above. Each word in the message is hashed, and then each bit of the hash is encrypted into a ciphertext.

The message server 104 is configured to perform operations on received ciphertexts 122 forming the encrypted message, and forward the received ciphertexts 122 to the intended recipient(s) along with a resultant ciphertext 124 representative of a likelihood that the original message 114 is spam and thus a probability that message should be filtered out.

The message server 104 is configured to reference a trigger word (spam) database 126 that stores spam trigger words in hashed form, as plaintext or ciphertext, in association with corresponding trigger word probabilities that indicate the relative contribution of the presence of a trigger word to the total likelihood that the message is spam. With reference back to FIG. 1, each of the spam trigger words is a data element input at the operation input buffer 24, and the message server 104 is configured to perform the multiplication operation on combinations of ciphertexts and spam trigger words and sum results of several multiplication operations to obtain a resultant ciphertext representative of spam probability.

FIGS. 9-11 show pseudocode of functions that can be implemented at the message server 104 to realize the above. When the device 10 is used as the basis for operation of the message server 104, the functions can, for example, be implemented at the control logic 22. The multiplication and addition operators, which correspond to blocks 16, 18 of FIG. 1 and which are described throughout this disclosure, are shown symbolically in FIGS. 9-11 as "×" and "+", respectively.

Pseudocode for a homomorphic spam filter function is shown in FIG. 9. Each ciphertext 122 representing a message 114 is compared to each trigger word in the trigger word database 126 by performing a word matching function, which is shown as pseudocode in FIG. 10. The word matching function performs a bitwise comparison of binary representations of a hash of a ciphertext and a hash of a trigger word, using successive multiplications to accumulate a binary match value indicative of whether the ciphertext is a spam word or not. Only the words that find a match in the database will contribute towards the final probability. If it is desired to store the trigger words in encrypted form, the encrypted word matching function of FIG. 11 (homomorphic XNOR) can be used instead of the word matching function of FIG. 10. Keeping the database encrypted may help protect it from outside attackers, but this may add the extra cost of two additional ciphertext multiplications to implement the XNOR operation.

The spam filter function shown in FIG. 9 computes a running additive total of the match value returned from the word matching function multiplied by the corresponding trigger word probability. The spam filter function returns the running additive total, or probability, as the resultant ciphertext 124 representative of the likelihood that the original message 114 is spam and thus the probability that message should be filtered out.

Each of the remote terminals 102 associated with the intended recipients of the original message 114 receives the sequence of ciphertexts 122 representative of the message 114 from the server 104. Each of such remote terminals 102 further receives the resultant ciphertext 124 representative of the spam probability for the message 114. Each of such remote terminals 102 is configured to decrypt the resultant ciphertext 124 using the secret key 128 to obtain a machine-intelligible value, such as a floating point number, representing the probability 130 that message should be filtered out. A suitably configured threshold can be used to evaluate the probability 130 to determine whether the ciphertexts 122 should be discarded (spam) or decrypted (ham) to obtain the human-intelligible message 114 and present such to the recipient.

Figure 12:
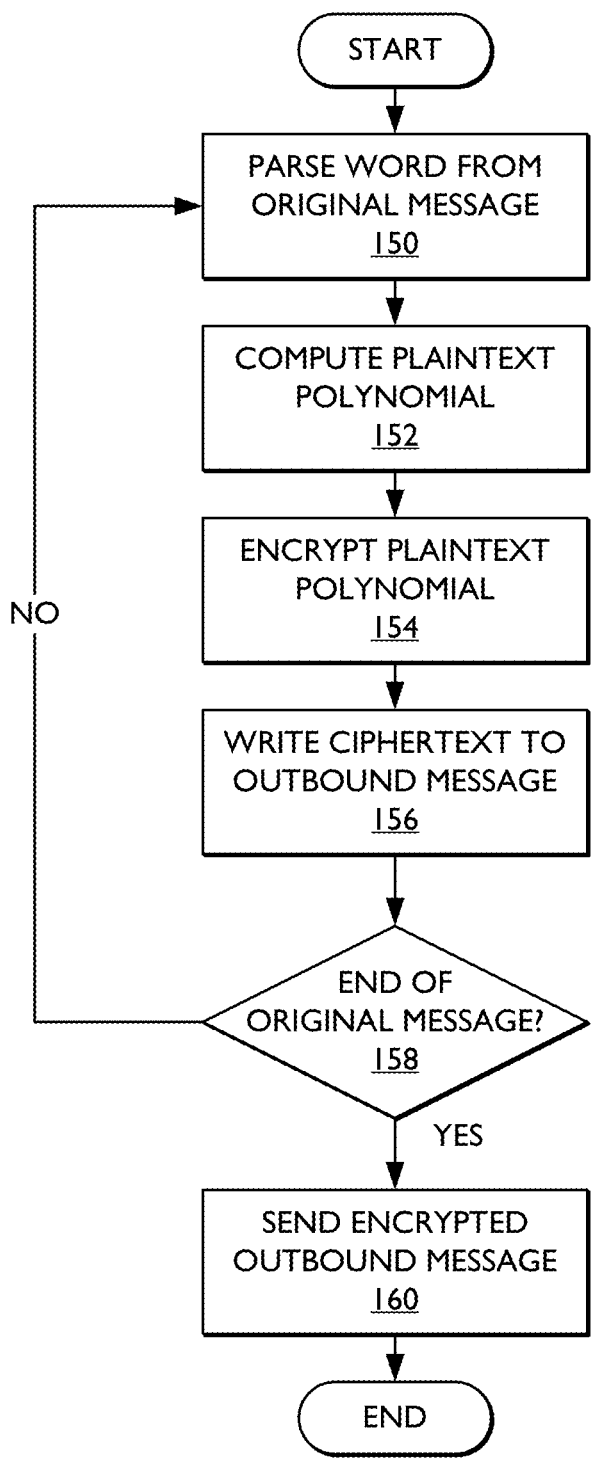
FIG. 12 is a flowchart of a process for encrypting and sending a message.

FIG. 12 is a flowchart that shows the client-side encryption process discussed above. FIG. 8 may be referenced as well. Each individual word of an inputted message, such as an email, is parsed at step 150, by for example a regular expression that isolates a next word from arbitrary string of text. The parsed word is hashed to its binary value, in which each bit is stored into one plaintext polynomial at step 152. Step 154 encrypts the plaintext polynomial, so that step 156 can write the resulting one or more ciphertexts to an outbound message. Every individual word of the message is processed in this manner, as checked by an end-of-message condition at step 158. Once the entire message has been transformed into a sequence of ciphertexts, it is sent to the intended recipient(s) at step 160.

Figure 13:
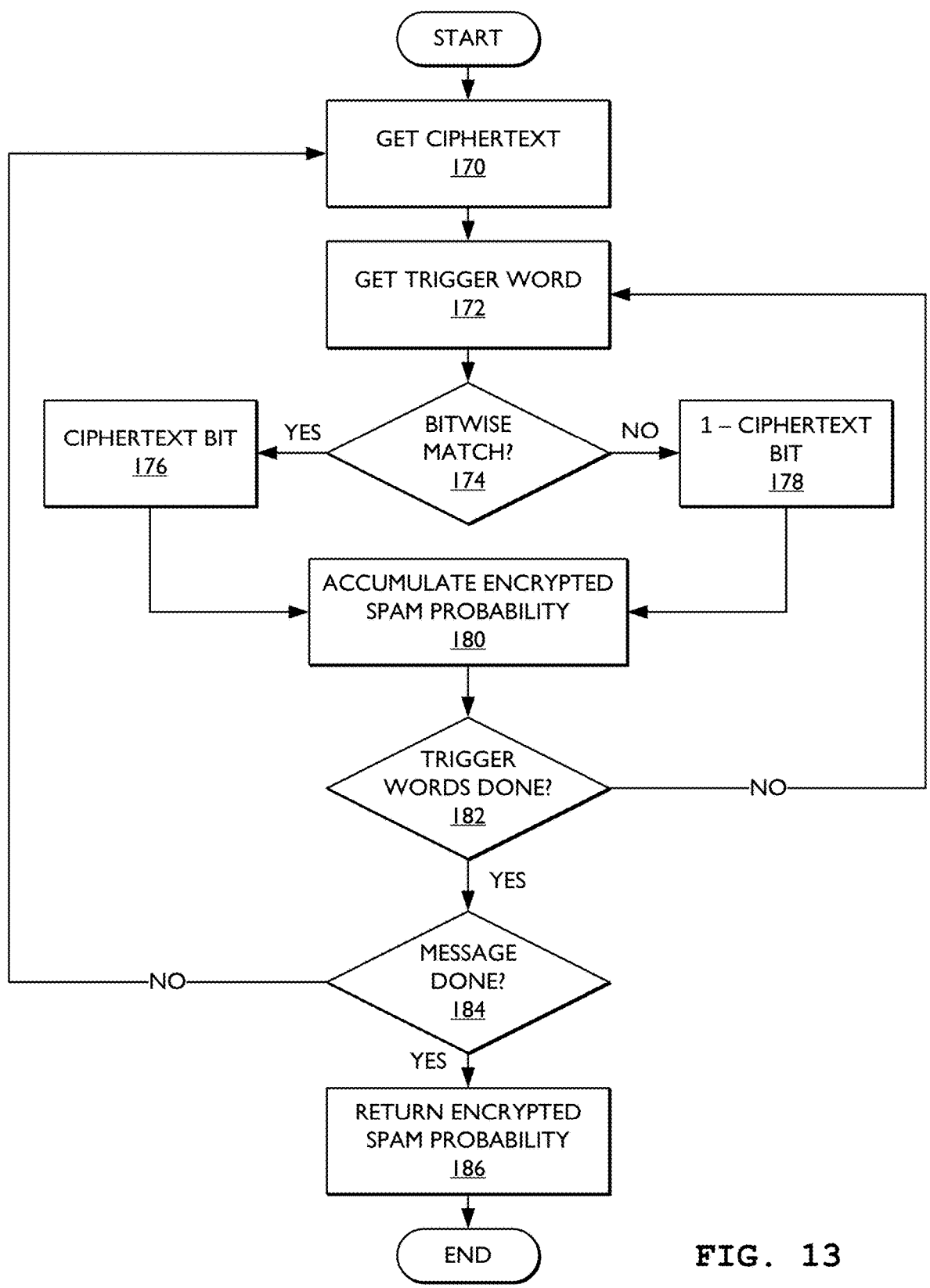
FIG. 13 is a flowchart of a process for determining spam probability for an encrypted message.

FIG. 13 is a flowchart that shows the server-side operations for computing spam probability for a particular received group of ciphertexts representative of a message to be delivered to one or more recipients. At step 170, the one or more ciphertexts representing the next word of the message are obtained. In the examples discussed herein, it is expected that each word of the message corresponds to k ciphertexts. Next, at step 172, the next trigger word is obtained and converted to its polynomial representation. Computing polynomial representations for trigger words on an as-needed basis can advantageously reduce total storage space required at the trigger word database 126. Step 174 performs a bitwise match evaluation on the ciphertext and the polynomial representation of the trigger word by multiplicatively accumulating a match value over corresponding bits. When a match is determined, at step 176, the ciphertext bit under consideration is multiplied into a multiplicatively accumulated match value (FIG. 10) whose result is then, at step 180, multiplied by a probability associated with the current trigger word and multiplicatively accumulated into the total probability (FIG. 9) for the current message word represented by a sequence of ciphertexts. When a match is not determined, the same process is performed using a value of 1 less the ciphertext bit under consideration, as shown by step 178. The process iterates over all trigger words, via step 182, while accumulating the total probability. The process further iterates over all sequences of ciphertexts representative of all message words, via step 184, while accumulating the total probability, which, when outputted at step 186 represents the probability that the message is spam. It is noteworthy that this process operates in the encrypted domain, as far as the message is concerned, and hence the spam probability is also encrypted. This advantageously prevents users with privileged access to the server from obtaining information about the message.

Figure 14:
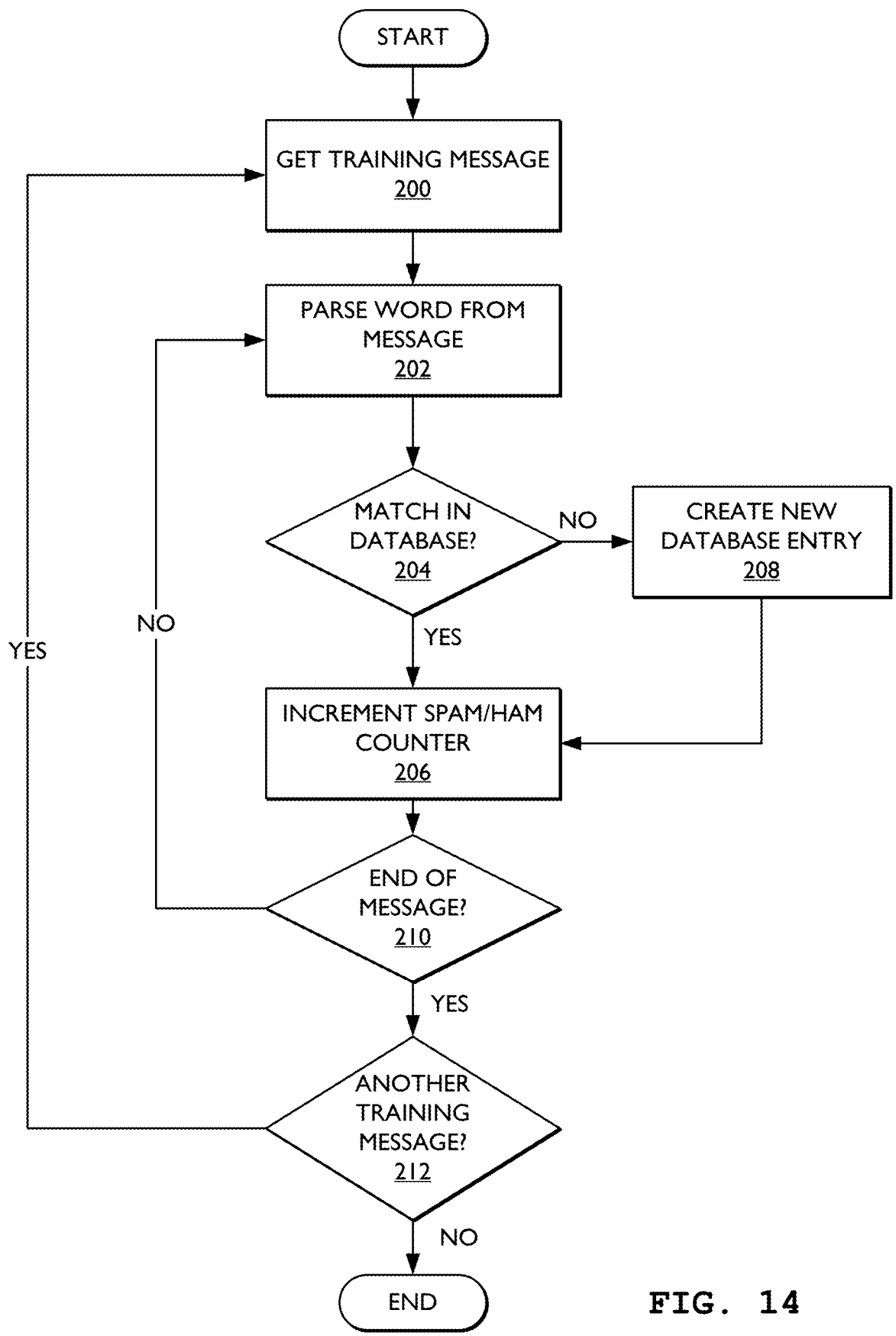
FIG. 14 is a flowchart of a process for training a message filter.

An example training process for the messaging system is shown in FIG. 14. The process iterates through a set of training messages containing human-readable words, via steps 200, 212. For each training message, each word is considered, via steps 202, 210. When a given message word matches a word in a trigger word database, at step 204, the appropriate counter for that word is incremented, at step 206. The given word is added to the database, at step 208, if it is not present in the database before incrementing the counter. Words may be stored in the database as hashes. The counters can be normalized to probabilities based on the total number of messages and words considered.

The principles underlying the messaging system of FIG. 7, the functions of FIGS. 8-11, and processes shown in FIGS. 12-14 are described in further detail below.

The messaging system implements a homomorphic version of Bayesian spam filter. The underlying principle of a Bayesian classifier is that words have certain probabilities of occurrence in authentic emails (known as ham emails) and in spam (undesired) emails. Email training sets can be used to estimate these probabilities. A training phase can be made to take place on unencrypted training sets, with the results stored a database of trigger words together with probabilities associated to each word arising in spam email. Once this database is created, the word probabilities are used to classify new emails. It is noted that email is an example of electronic messaging that can benefit from the techniques discussed herein.

Taking $p_w$ to denote the probability that a word w occurs in spam email, and given an email with key words $(w_1, \ldots, w_K)$, there are many techniques to combine the probabilities of each word to compute a final estimate of whether the email should be classified as spam. One method is to use Bayes rule. This results in the expression in FIG. 25h for p, the probability that the email will be classified as spam. Generally, the email server will receive encrypted words $w_i$, and map them, homomorphically, into the numbers $p_w$. Once these numbers $p_w$ are obtained, the expression in FIG. 25h can be computed to obtain probability p.

In order to overcome resource expensive integer divisions required by the expression in FIG. 25h, the present techniques include reformulating the expression in FIG. 25h as the expressions in FIGS. 25i and 25j. In other words, the email training phase stores the numbers $\eta_w$ for each word w in the dictionary (rather than the numbers $p_w$). The numbers $\eta_w$ are represented as binary fixed-point numbers, whose bits are encoded into the coefficients of polynomial $\pi_w$. For example, $\eta_w=101_b$ is represented as the polynomial $\pi_w=x^0+x^2$. The addition of two binary polynomials will not generate a carry between adjacent polynomial elements, rather polynomial elements will grow individually and will be appropriately reconstructed after decryption (e.g. $101_b+111_b=212$, which will be constructed back after decryption to $1100_b$). The encrypted spam filter function takes as input an encrypted word w, maps it first into an encrypted $\eta_w$ as shown in FIG. 9, and then performs a homomorphic addition of the $\eta_w$ to get an encrypted $\eta$. This is then sent to the remote terminal which decrypts and recovers $\eta$ using the secret key, and computes probability $p=1/(2^\eta+1)$ in the clear.

Concerning mapping encrypted words w into output encrypted $\eta_w$, the present techniques allow for homomorphic computation on outputted encrypted data to obtain useful information. This has advantages over prior techniques that cannot implement data-classifiers as discussed herein because they tend to: (a) not be able to compute with responses, or, (b) have plaintext fields of only mod 2 (or modulo a small prime, for efficiency purposes). Thus, such prior techniques cannot do integer addition as required by the expression of FIG. 25i. The techniques discussed herein have the advantage of being able to use the full modulo-q domain for plaintext additions.

With reference back to FIG. 7, in order to increase the performance and efficiency of the messaging system 100, several further techniques may be applied. Each of these techniques may be implemented independently of the others.

First, by storing probability numbers in a single polynomial entry (e.g., $\eta=5, \pi=5x^0$), the other polynomial entries will be unused. This will also lead to the rapid growth of the final result. Hence, probability numbers can be stored as binary bits in adjacent polynomial entries (e.g., $\eta=5=101_b$, $\pi=x^0+x^2$). Unused slots will beneficially result. When adjacent slots are added without a carry propagate, values in individual slots will grow slowly and logarithmically. By having individual polynomial slot values grow logarithmically, a logarithmic growth in ciphertext noise may result, as discussed above.

Second, concerning the bitwise matching function of FIG. 10, the database entries for trigger words can be stored as hashes in ascending order. Consecutive matching bits can be inferred in adjacent entries in the database to skip redundant computations. For example, considering two 4-bit database entries 1001 and 1011, both entries share the left-most two bits "10". Instead of performing six multiplication operations to match an input encrypted word with those two entries, partial matching results can be stored for the left-most two bits "10", which can result in multiplication operations being reduced to four. Experimental results for a database of size $10^5$ and hash numbers of size 32-bits show that the number of multiplications needed for matching one word across the entire database decrease from $32 \cdot 10^5$ to $16 \cdot 10^5$ which is a reduction by a factor of about 2 in the number of multiplications.

With reference to FIG. 14, an encrypted data search system 300 incorporating the present techniques is shown. The system 300 can be encrypted data store, such as cloud-computing data repository, that receives encrypted data from remote terminals 302, such as computers, smartphones, tablet devices, IoT devices, smart-grid devices, medical devices, and the like. The system 300 is capable performing queries on such data, advantageously without decrypting ciphertext or having access to secret keys.

A data server 304, such as a cloud-based data server, is configured to implement functionality of the device 10 of FIG. 1. That is, the data server 304 performs operations on stored ciphertext and outputs resultant ciphertexts. The data server 304 operates exclusively in the ciphertext domain. The data server 304 may control one or more databases 326 that actually store the encrypted data.

Each of the remote terminals 302 is configured to implement functionality of the device 50 of FIG. 2. That is, a remote terminal 302 can implement at least one of the encryption and decryption systems described with respect to FIG. 2. Each of the remote terminals 302 connects to the data server 304 via a wide-area network 306, such as the Internet.

Encrypted data can be transmitted to the data server 304 in various ways. Each of the remote terminals 302 may be configured to encrypt and upload data, or only a subset of such terminals may have that privilege. Additionally or alternatively, encrypted data may be provided to the server 304 directly as bypassing the network 306, such as via a local terminal, memory stick, portable solid-state drive (SSD), DVD, RFID device, or similar. Other devices capable of providing "air gap" physical isolation are also contemplated.

At least one of the remote terminals 302 is configured to receive input of search query 314 for a set of data stored at the server 304 and database 326. The search query 314 can, for example, be a text search string composed of one or more keywords.

The remote terminal 302 is further configured to segment search query 314 into units of plaintext 316. For instance, the remote terminal 302 can be configured to hash each keyword of the query 314 to a unique number of uniform bit length (e.g., 16 bits, 32 bits, or other value) to obtain a sequence of plaintexts 316 that represent the query 314. The remote terminal 302 is further configured to use its public key 318, which may be stored locally or fetched from a public key server 320 or other source, to encrypt each of the plaintexts 316 of the query 314 into a ciphertext 322 according to the techniques discussed elsewhere herein. It is contemplated that each keyword is represented by a sequence or group of ciphertexts, though this is not intended to be limiting. The remote terminal 302 is further configured to send all of ciphertexts 322 representative of the search query 314 to the data server 304. The pseudocode of FIG. 8 can be used to realize encryption described in the above.

The server 304 is configured to perform operations on received ciphertexts 322 forming the search query and respond with at least one resultant ciphertext 324 representative of the search result. The operations performed can be identical or similar to those described elsewhere herein. In one example, the search query is a word list whose presence in a larger word list stored at the database 326 is desired to be determined.

FIG. 16 shows an example function for a multiple keyword search that can be performed by the server 304. A set of encrypted keywords are compared to words stored in a file, where the ciphertexts of each encrypted keyword are matched against the ciphertexts of the stored words. Matching may be performed by the encrypted matching function of FIG. 11, or alternatively the matching function of FIG. 10 if stored words are unencrypted. The resultant ciphertext 324 is returned and transmitted to the querying remote terminal 302.

The remote terminal 302 receives the resultant ciphertext 324 and is configured to decrypt the resultant ciphertext 324 using the secret key 328 that corresponds to the public key 318. This obtains a human-intelligible query result 330 of the search query 314.

The encrypted data search system 300 can be used to implement stored data search functionality, such as a secure email search, a security watchlist check, privacy-enhanced email monitoring, financial data processing, medical record processing, security access control, sensor signal processing, and similar. Data that is encrypted may include text, sensor signal levels, etc., and is not necessarily human-intelligible.

It is contemplated that a remote terminal 302 situated at an airport can allow an agent to encrypt passenger names and search for them in an encrypted watchlist stored at the database 326. This may help preserve the security of the watchlist without compromising the privacy of the passengers being checked. Alternatively, the computational complexity of the system 300 can be decreased if the input keywords are not encrypted, with the data being searched remaining encrypted. In this case, the match function of FIG. 10 can be used in place of the encrypted match function of FIG. 11, to reduce the computations needed.

Figure 15:
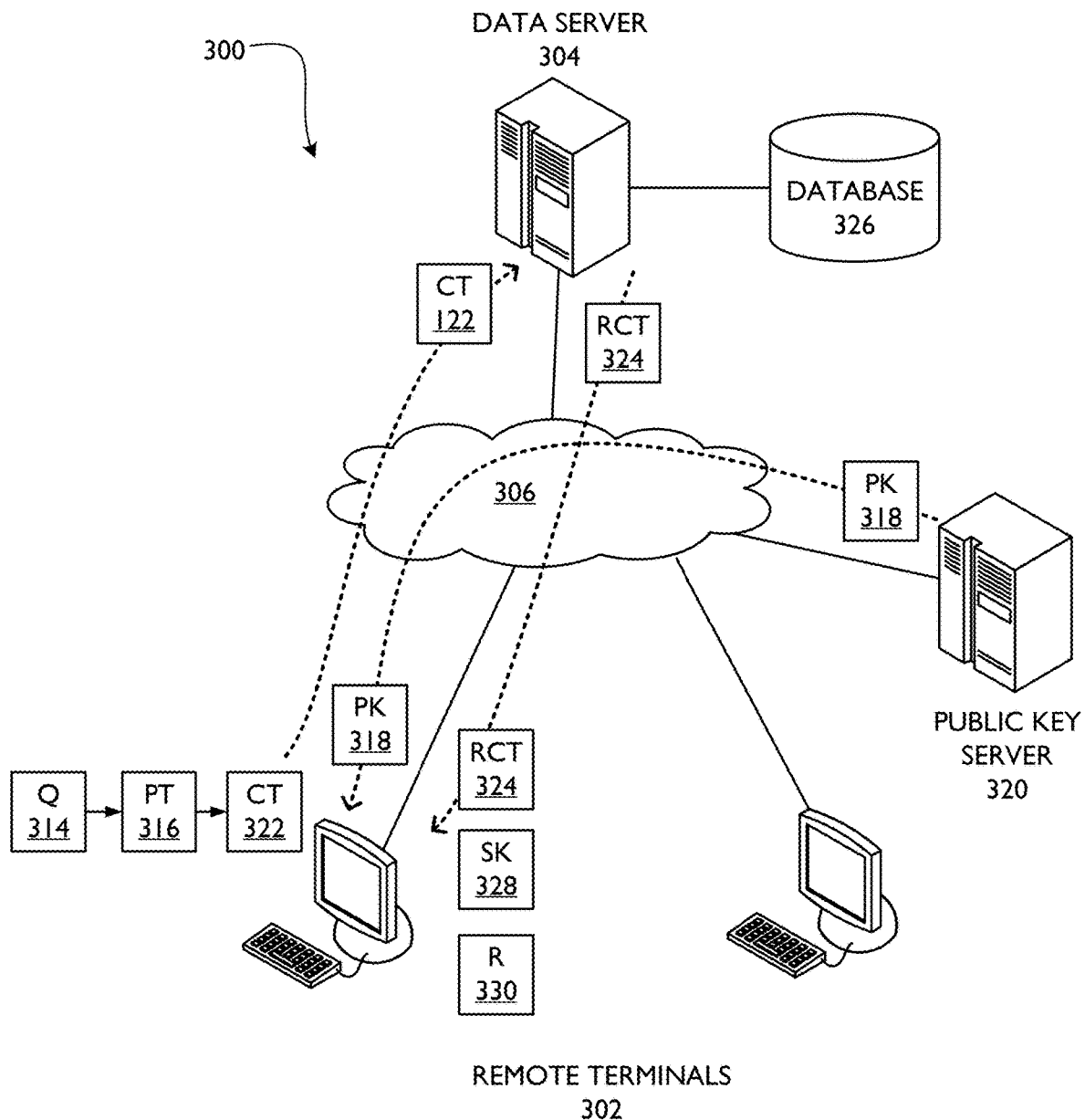
FIG. 15 is a schematic diagram of an encrypted data search system.

Another useful security application is monitoring encrypted emails for keywords without unduly compromising the privacy of the senders and receivers of the emails. This can be implemented with the message system 100 discussed above with respect to FIG. 7, in which the search function of FIG. 16 is used instead of the filtering function of FIG. 9, so as to compute a number of matched keywords in a given message rather than a probability of spam. In similar implementations, the concept of "spam filter" can be adapted to the concept of "security threat filter" or other concept, with the same system 100 being used but with different trigger words and probabilities representative of levels of security concern. Encrypted email messages and resultant ciphertexts representative of probabilities or matches are stored by the message system or by another system, such as a system operated by a security agency or its proxy. When a security agency determines, through means outside the scope of the present techniques, that one or more particular email messages potentially contain information that may be relevant to security concerns, the relevant secret key can be used to decrypt the probability/match ciphertext for each such message. If a decrypted probability/match indicates that the security concern is indeed warranted, the secret key can then be used to decrypt the associated email message. On the other hand, if the decrypted probability indicates insufficient security concern, then the email message is not decrypted and privacy of the communication is maintained. It is contemplated that a neutral third party, such as a court of law, oversees use of the secret key to decrypt the probability and, if warranted, the email message. This two-step process advantageously allows security agencies to decrypt only those messages that meet a probability/match indicative of a security concern. For other messages, privacy between correspondents is maintained. In another example, secret keys are made available to the security agency, which is only given access to probability/match ciphertexts in the messaging system. The agency does not normally have access to encrypted messages. However, the agency may decrypt probability/match ciphertexts as needed, and then obtain court orders or other legal instruments to obtain messages associated with a high degree of probability/match. In addition, the above principles also apply to a security agency monitoring encrypted stored data, such as provided by the system of FIG. 15.

In addition, if the search result desired is a Boolean true/false indication or flag of the presence of the search query in the database, then particular techniques discussed herein can be advantageously exploited. As discussed above, low or zero error corresponds to plaintext of zero. Many multiplication operations to be done to match one entry, as in the expression in FIG. 25e, may lead to the rapid growth of the noise in the ciphertext, so that it may not be decrypted correctly. On the other hand, non-matching items have results with much less noise. This means that when the resulting plaintext flag is "0", it will most likely be decrypted correctly. If an error during decryption exceeds an error threshold, then the resulting flag can be taken as "1". This is contemplated to hold, even if the computation becomes submerged in noise. Thus, in the watchlist example, a "hit" or "miss" of a name on the watchlist can be determined even when noise is substantial. Decryption error yielding a meaningful bit of information is advantageous over known lattice-based homomorphic encryption schemes that fail when error exceeds a certain threshold.

Figure 17:
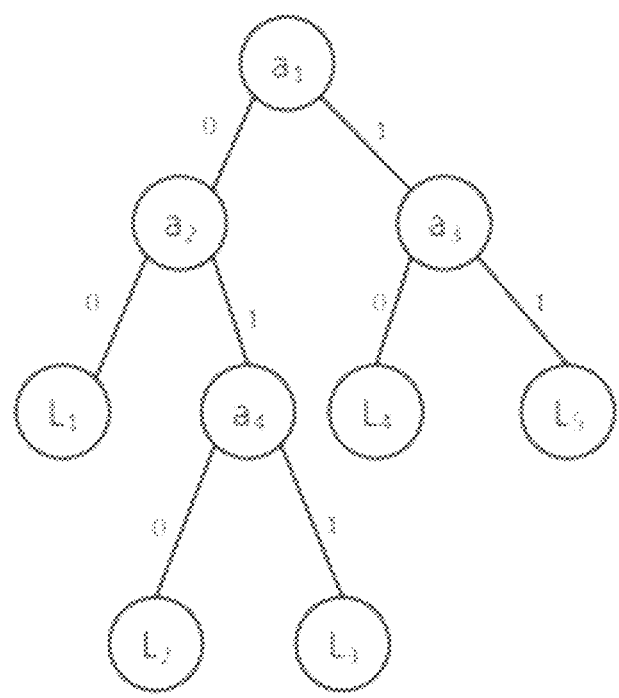
FIG. 17 is schematic diagram of a binary tree.

Another application of the present techniques is binary decision trees. Binary decision trees are classifiers consisting of interior nodes and leaf nodes. Interior nodes are decision nodes which decide which direction the tree should follow. Leaf nodes are the final tree decision. Binary decision trees can be considered similar to the spam filter described previously. FIG. 17 shows an example of a binary decision tree with four nodes and five leafs.

The decision tree shown in FIG. 17 can be expressed as polynomial equation as shown in FIG. 25k, and such a polynomial equation can be efficiently implemented in encrypted form using the techniques discussed herein.

Figure 18:
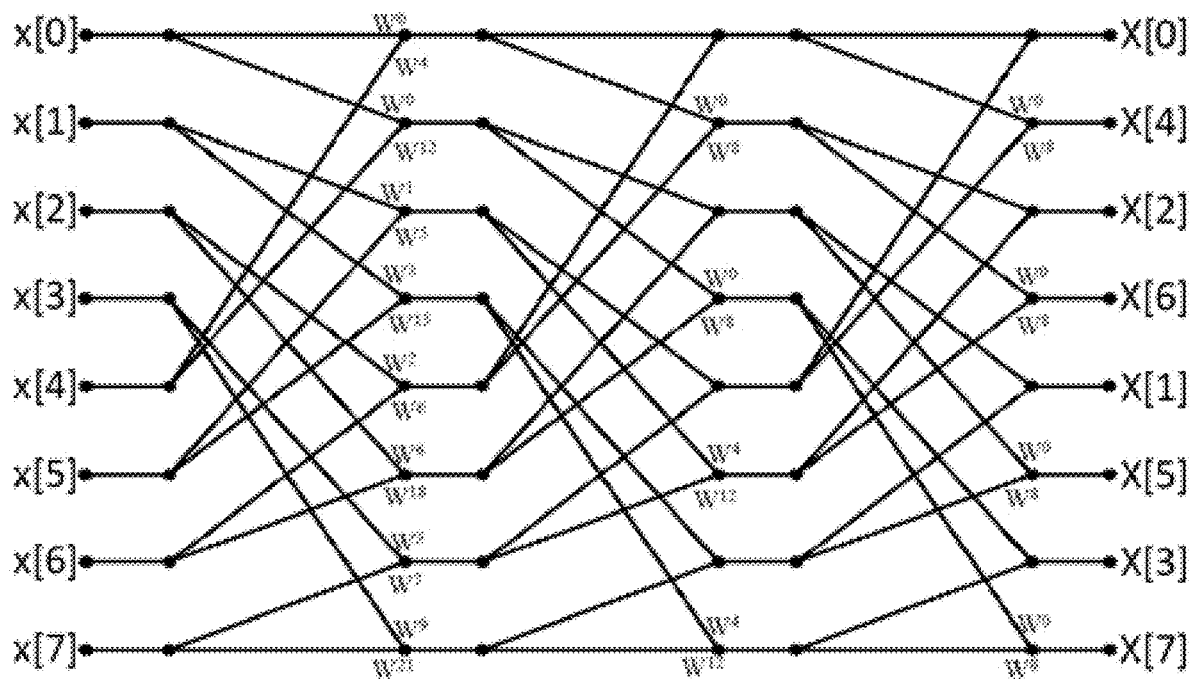
FIG. 18 is a diagram of a number theoretic transform.

Turning now to FIG. 18, the number theoretic transform (NTT) engine 17 (FIG. 1) is now discussed. The NTT engine 17 is configured to distribute NTT computations among a plurality of processing cores of, for example, a GPU as part of the multiplication operation. In one example, 256 CUDA cores are used within the GPU. The NTT engine 17 can speed up the polynomial convolution operation to O(n log(n)) for the finite field modular polynomial multiplications. Excessive random memory access on devices implementing the techniques discussed herein may hurt performance. The NTT engine 17 is configured to exploit serial memory accesses as may be suited for the global memory architecture of a GPU.

Concerning the principles of operation of the NTT engine 17, converting a polynomial to its NTT representation involves evaluating the polynomial at the roots of unity of $\phi_m$. The roots of unity of $\phi_m(X)=x^n+1$ are in the form of odd powers of $\zeta$ (i.e., roots=$\zeta^{2k+1}$ for $0 \leq k < n$), where $\zeta$ is the $n^{th}$ root of unity. For $\zeta$ to be a valid $n^{th}$ root of unity, it must satisfy both these conditions: a) $\zeta^{2n}=1$ mod q and b) $\zeta^i \neq 1$ mod q for i<2n. The equation for the N-point forward NTT transform is as shown in FIG. 25*l*, where W=$\zeta$. W is also called the twiddle factor.

Example NTT architecture for an 8-point NTT is shown in FIG. 18. This architecture has the same structure for each level and supports sequential memory accesses, which is well suited for GPU implementation. The twiddle factors are reformatted to reduce the number of modulus operations needed. The inverse NTT engine can be seen viewing FIG. 18 from the right side. The N-point inverse NTT equation is as shown in FIG. 25*m*.

Finite field NTT is performed modulo a specific modulus q as was described above. Modulus reduction can be performed using successive addition and subtraction operations modulo the same prime q. Solinas primes, which are known, support high efficiency modulo reduction. It may be advantageous to select the Solinas primes q=0x7FFE001 to fit the prime number bit width $\ell$ =31 bits. For example, if an input number a is in the form shown in the expression of FIG. 25*n*, then the modulus operation modulo q=0x7FFE001 is as shown in FIG. 25*o*, where "<<" is a shift left operation.

Figure 19:
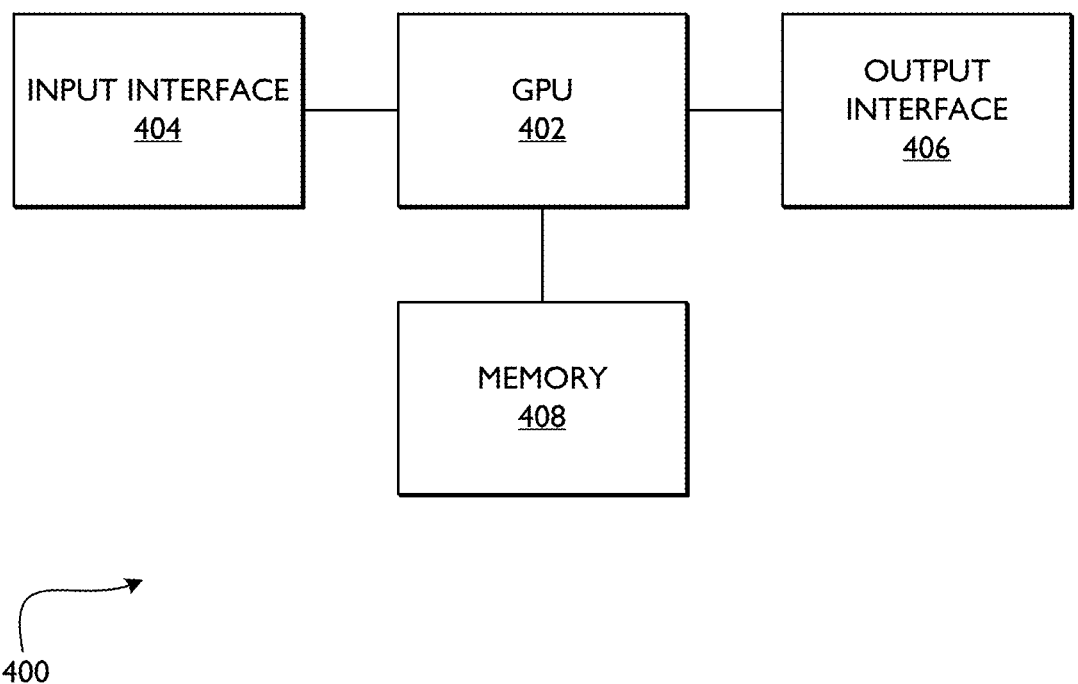
FIG. 19 is a block diagram of device including a graphics processing unit (GPU) for performing the present techniques.

FIG. 19 shows a device 400 for implementing the techniques discussed herein. The device 400 can be used to implement any of the devices, terminals, and servers described herein, as well as any of the other functionality described herein. The device includes a GPU 402, an input interface 404, an output interface 406, and memory 408. The input interface 404 is configured to receive data and commands from a user interface, a network, or similar source. The output interface 406 is configured to output data to the user interface, the network, or similar source. The memory 408 stores data and commands, which may include plaintexts, ciphertexts, and sequences of operational commands such as the functions and processes discussed herein. The GPU 402 is connected to the input interface 404, the output interface 406, and the memory 408 and is configured to process one or more of encryption, decryption, multiplication, and addition, as described herein. The present techniques are scalable and parallelizable. Increasing the number of GPUs 402 can reduce running time proportionally.

Figures 20, 21:
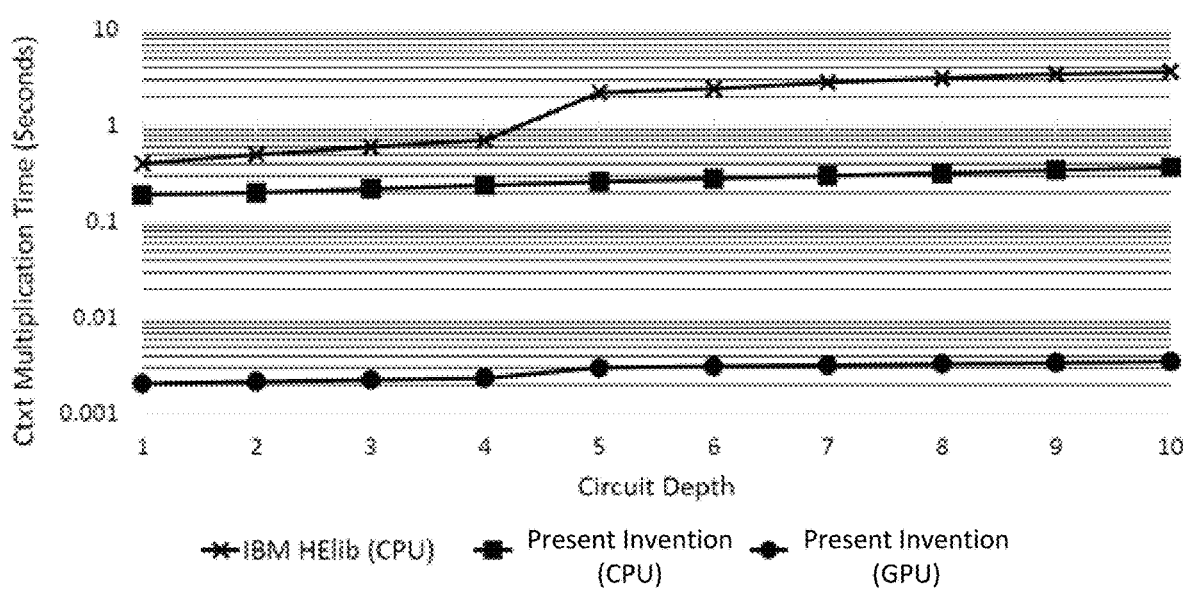

Example results of tests conducted using the techniques described above are now discussed. FIG. 20 shows the design environment used.

FIG. 21 shows running time (log scale) results for ciphertext multiplication for various circuit depths. The bottleneck that tends to be caused by multiplication in prior techniques, such as IBM HElib which was run on a single CPU core for comparison purposes, is evident. To exploit the parallelism discussed above, the GPU tests partitioned the polynomial operations across GPU cores. Such parallelism is not possible with IBM HElib and the results reflect such. Multiplication operations using the present techniques, when executed on CPU and GPU, show speed improvements over IBM HElib. It can be noticed from FIG. 21 that CPU and GPU implementations according to the present invention can experience speeds that are about 10 times and about 1035 times faster, respectively, compared to IBM HElib, across circuit depths larger than 5.

FIG. 22 summarizes the performance results of the present techniques compared to IBM HElib and a scheme proposed by Naehrig, Lauter, and Vaikuntanathan at a circuit depth equal 10. Running times are in seconds and comparison factors are shown.

FIG. 23 shows example ciphertexts sizes for the present techniques and the IBM HElib library.

Figure 24:
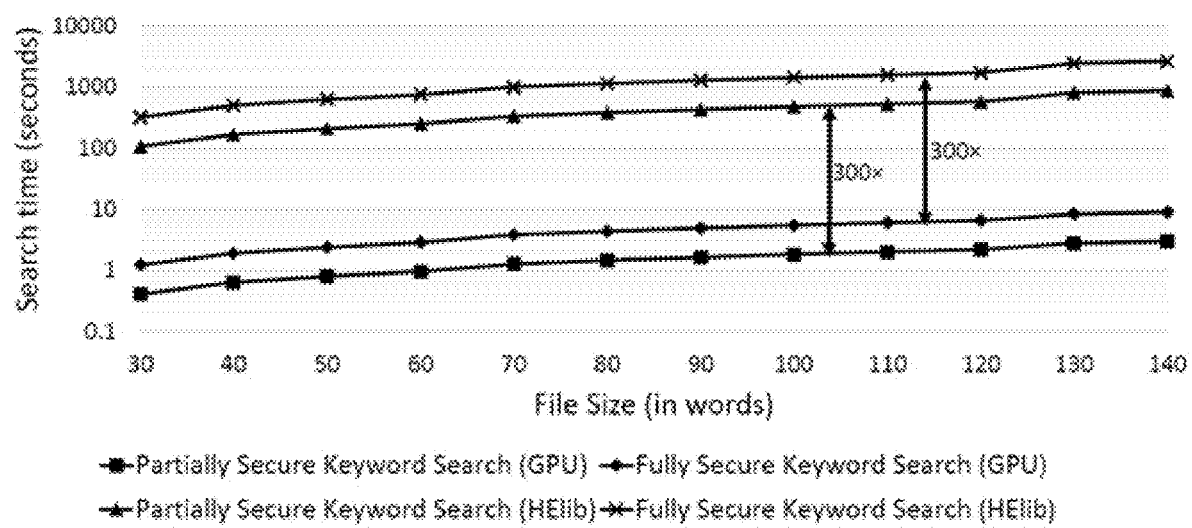

FIG. 24 shows performance of the keyword search system, described above, was compared to IBM HElib for different file sizes. An increase in speed of about 300 times was seen in the fully secure keyword search on a GPU compared to IBM HElib. The fully secure search has the search query and the target data to be searched encrypted, while the partially secure search has search query in plain text and the target data encrypted.

Concerning binary decision trees, performance of the decision tree depends on the tree structure and the number of nodes and leafs, which affects parameter selection and ciphertext operation running times. The decision tree running time depends mainly on the number of multiplications needed. For example, the polynomial equation (16) that describes the tree has 8 multiplication operations and each multiplication operation takes about 3.477 milliseconds, which results in a total running time of 27 milliseconds compared to several seconds using prior techniques.

Many advantages of the present invention have been described above. For instance, slower growth of noise, and thus improved parameter selection are possible for a given security level. Processing speed is increased and storage space is reduced, thereby rendering the use of homomorphic encryption more practical than in the past. Secret keys may be smaller by a factor of log(q), the number of operations in ciphertext multiplication may be reduced by a factor of log(q), and ciphertext size may be reduced by a factor of log(q), when compared to known techniques. The techniques are deterministic, unlike some past attempts. Moreover, due to the growing use of cloud computing, privacy concerns have begun to escalate. The secure systems and processes discussed above can advantageously provide very useful tools to address these concerns.

While the foregoing provides certain non-limiting example embodiments, it should be understood that combinations, subsets, and variations of the foregoing are contemplated. The monopoly sought is defined by the claims.

What is claimed is:

1. A computer-implemented system for homomorphic encryption, the computer-implemented system comprising:
a control device configured to forward one or more data elements to an operation device, the one or more data elements representative of stored data to be searched, the control device configured to forward one or more operation commands to the operation device, the control device configured to execute program code stored in a memory to configure the operation device to perform a sequence of one or more homomorphic operations on a ciphertext, using one search using the one or more data elements and the one or more operation commands to obtain a resultant ciphertext, the ciphertext representative of at least one search query, at least one of the one or more homomorphic operations being a homomorphic multiplication operation, the homomorphic multiplication operation performed by:
performing a bitwise decomposition function on the ciphertext to obtain a bitwise decomposed ciphertext, the bitwise decomposition function mapping a multi-bit data type to a sequence of bits; and
performing matrix multiplication on the bitwise decomposed ciphertext and one of the one or more data elements, the one of the one or more data elements according with an inverse bitwise decomposition of the ciphertext, the inverse bitwise decomposition mapping a sequence of bits to the multi-bit data type; and an encrypted search engine configured to execute the at least one search query using the operation device.

2. The computer-implemented system of claim 1, the homomorphic multiplication operation further comprising performing number theoretic transform (NTT) computations.

3. The computer-implemented system of claim 2, each number theoretic transform computation distributed among a plurality of processing cores.

4. The computer-implemented system of claim 1, at least one of the one or more homomorphic operations being a homomorphic addition operation, the homomorphic addition operation being performed by:
performing matrix addition on the ciphertext and one of the one or more data elements.

5. The computer-implemented system of claim 1, the control device further configured to execute program code in the memory to provide the resultant ciphertext to the operation device to perform a sequence of one or more homomorphic operations on the resultant ciphertext.

6. The computer-implemented system of claim 1, the bitwise decomposed ciphertext being a i-dimensional vector $[d(0), \ldots, d(l-1)]$, where $d(0), \ldots, d(l-1)$ are polynomials with $\{0-1\}$ coefficients such that $d=\Sigma_{\tau=0}^{l-1} d(\tau) \cdot 2^{\tau}$.

7. A computer-implemented process for homomorphic encryption, the computer-implemented process comprising:
computing a plaintext polynomial of a plaintext input, the plaintext polynomial bound to a message space of a polynomial-based fully homomorphic cryptographic scheme;
generating an expanded plaintext polynomial by performing matrix multiplication on the plaintext polynomial and an identity matrix of the polynomial-based fully homomorphic cryptographic scheme, the identity matrix according with an inverse bitwise decomposition that maps a sequence of bits of the identity matrix to a multi-bit data type;
encrypting the expanded plaintext polynomial by applying a public key to the expanded plaintext polynomial to generate a ciphertext, the ciphertext representative of at least one search query; and
executing the at least one search query using the ciphertext.

8. The computer-implemented process of claim 7, the public key selected based on an intended recipient of the plaintext input.

9. The computer-implemented process of claim 7, the public key being $A_{1\times 2}=[b\ a]$ based on a uniform sample $a \leftarrow R_q$, $e \leftarrow D_{R_q, \sigma_k}$ and set $b=a \cdot t+e$, the public key having a complementary private key, the complementary secret key being $s_{2\times 1} \leftarrow [1;\ -t] \in R_q^2$, where polynomial $t \leftarrow D_{R_q, \sigma_k}$.

10. A computer-implemented process for homomorphic encryption, the computer-implemented process comprising:
receiving a ciphertext; and
decrypting the ciphertext using a private key complementary to a public key used to encrypt an expanded plaintext polynomial to generate the ciphertext, the decrypting to generate a plaintext polynomial.

11. The computer-implemented process of claim 10, the expanded plaintext polynomial generated by performing matrix multiplication on a plaintext polynomial and an identity matrix of a polynomial-based fully homomorphic cryptographic scheme, the identity matrix according with an inverse bitwise decomposition that maps a sequence of bits of the identity matrix to a multi-bit data type, the plaintext polynomial bound to a message space of the polynomial-based fully homomorphic cryptographic scheme.

12. The computer-implemented process of claim 10, the decrypting being by multiplying the ciphertext by the private key, the multiplying being $C_{N\times 2} \cdot s_{2\times 1} = \mu \cdot BDI(I_{N\times N}) \cdot s_{2\times 1}+$error, where $C_{N\times 2}$ is the ciphertext, $s_{2\times 1}$ is the private key, and $\mu$ is the plaintext, where $\mu \in R_q$.

13. The computer-implemented process of claim 10, the decrypting being by multiplying the ciphertext by the private key to generate an expression having terms, each term having a most significant bit, each of the most significant bits encoding a single bit from the plaintext.

14. The computer-implemented process of claim 7, the plaintext polynomial representing a decision tree.

15. A computer-implemented process for homomorphic encryption, the computer-implemented process comprising:
executing at least one search query, the executing comprising:
receiving a first ciphertext and a second ciphertext at a computer, each of the first ciphertext and the second ciphertext bound to a respective message space of a respective polynomial-based fully homomorphic cryptographic scheme, the first ciphertext representative of the at least one search query;
performing a homomorphic multiplication operation on the first ciphertext at the computer to obtain a resultant ciphertext by:
performing a bitwise decomposition function on the first ciphertext to obtain a bitwise decomposed ciphertext, the bitwise decomposition function mapping a multi-bit data type to a sequence of bits; and
performing matrix multiplication on the bitwise decomposed ciphertext and the second ciphertext; and
outputting the resultant ciphertext.

16. The computer-implemented process for homomorphic encryption of claim 15, the matrix multiplication being $BD(C_{N\times 2})\ D_{N\times 2}$, where $BD(C_{N\times 2})$ is the bitwise decomposed ciphertext, $C_{N\times 2}$ is the first ciphertext, and $D_{N\times 2}$ is the second ciphertext.

17. The computer-implemented process for homomorphic encryption of claim 15, further comprising performing a homomorphic addition operation on the first ciphertext by performing entry-wise addition between the first ciphertext and the second ciphertext.

18. The computer-implemented process for homomorphic encryption of claim 15, the bitwise decomposed ciphertext being the i-dimensional vector $[d(0), \ldots, d(l-1)]$, where $d(0), \ldots, d(l-1)$ are polynomials with $\{0-1\}$ coefficients such that $d=\Sigma_{\tau=0}^{l-1} d(\tau) \cdot 2^{\tau}$.

19. A computer-implemented process for homomorphic encryption, the computer-implemented process comprising:
receiving, at a computer, a plaintext derived from an electronic message; and
receiving a ciphertext generated using the plaintext and a public key, the ciphertext representative of at least one search query;
the ciphertext generated by:
computing a plaintext polynomial of the plaintext, the plaintext polynomial bound to a message space of a polynomial-based fully homomorphic cryptographic scheme;
generating an expanded plaintext polynomial by performing matrix multiplication on the plaintext polynomial and an identity matrix of the polynomial-based fully homomorphic cryptographic scheme, the identity matrix according with an inverse bitwise decomposition that maps a sequence of bits of the identity matrix to a multi-bit data type; and encrypting the expanded plaintext polynomial by applying the public key to the expanded plaintext polynomial to generate the ciphertext; and executing at least one encrypted search query using the ciphertext.

20. The computer-implemented process of claim 19, further comprising:

performing a multiplication operation between:

each of one or more ciphertexts including the ciphertext; and a data element;

to generate a result for each of the multiplication operations;

each of the multiplication operations performed by:

performing a bitwise decomposition function on the ciphertext to obtain a bitwise decomposed ciphertext, the bitwise decomposition function mapping a multi-bit data type to a sequence of bits; and performing matrix multiplication on the bitwise decomposed ciphertext and the data element to generate the result.

21. The computer-implemented process of claim 20, further comprising:

for each of the results of one or more multiplication operations including the multiplication operation, multiplying the result with a data element probability associated with the result to generate an interim probability; and summing the interim probabilities to generate a resultant ciphertext representative of a probability.

22. The computer-implemented process of claim 20, the one or more ciphertexts together representing the electronic message, the multiplication operation performed between each of one or more ciphertexts including the ciphertext and each of one or more data elements including the data element, each of the multiplication operations further comprising multiplicatively accumulating a bitwise comparison of binary representations of the ciphertext and of the data element to generate a binary match value representing a spam indicator of the ciphertext, the binary match value being the result.

23. The computer-implemented process of claim 20, the one or more ciphertexts together representing the electronic message, the multiplication operation performed between each of one or more ciphertexts including the ciphertext and each of one or more data elements including the data element, each of the multiplication operations further comprising a homomorphic XNOR operation on the ciphertext and the data element to generate a binary match value representing a spam indicator of the ciphertext, the binary match value being the result.

24. The computer-implemented process of claim 20, further comprising multiplicatively accumulating a resultant ciphertext of:

each of the results of one or more multiplication operations including the multiplication operation; and each of data element probabilities associated with the data element used to generate the result;

the resultant ciphertext representative of a probability.

25. A computer-implemented process for homomorphic encryption, the computer-implemented process comprising:

receiving, at a computer, the resultant ciphertext generated according to claim 24 and the ciphertext; and filtering the ciphertext based on a comparison result generated by comparing the resultant ciphertext and a threshold level, the ciphertext filtered based on the comparison result generated by comparing:

resultant ciphertexts including the resultant ciphertext, each resultant ciphertext generated according to claim 24; and the threshold level.

26. The computer-implemented process of claim 25, the comparing using steps according to $$p = \frac{p_{w_1} p_{w_2} \cdots p_{w_k}}{p_{w_1} p_{w_2} \cdots p_{w_k} + (1 - p_{w_1})(1 - p_{w_2}) \cdots (1 - p_{w_k})},$$

$$\eta \triangleq \log(1 - p) - \log p = \sum_{i=1}^{K} \left( \log(1 - p_{w_i}) - \log p_{w_i} \right), \text{ or}$$

$$\log(1 - p_{w_i}) - \log p_{w_i},$$

wherein $p_{w_k}$ is the resultant ciphertext of a k-th ciphertext w.

27. The computer-implemented process of claim 23, further comprising generating a resultant ciphertext representative of a search result corresponding to the ciphertext, the ciphertext derived from a search query, the resultant ciphertext generated based on one or more of the results.

* * * * *